(12) United States Patent
Kray et al.

(10) Patent No.: US 12,359,572 B2
(45) Date of Patent: *Jul. 15, 2025

(54) TURBINE ENGINE WITH COMPOSITE AIRFOILS

(71) Applicant: GENERAL ELECTRIC COMPANY, Evendale, OH (US)

(72) Inventors: Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,835

(22) Filed: Aug. 16, 2024

(65) Prior Publication Data

US 2024/0401488 A1 Dec. 5, 2024

Related U.S. Application Data

(63) Continuation-in-part of application No. 18/741,419, filed on Jun. 12, 2024, which is a continuation-in-part of application No. 18/171,533, filed on Feb. 20, 2023, now Pat. No. 12,158,082.

(51) Int. Cl.
| | |
|---|---|
| *F01D 5/14* | (2006.01) |
| *F01D 5/28* | (2006.01) |
| *F01D 9/04* | (2006.01) |
| *F01D 25/00* | (2006.01) |

(52) U.S. Cl.
CPC ............ *F01D 5/282* (2013.01); *F01D 5/147* (2013.01); *F01D 9/04* (2013.01); *F01D 25/005* (2013.01); *F05D 2220/323* (2013.01); *F05D 2240/12* (2013.01); *F05D 2240/303* (2013.01); *F05D 2300/603* (2013.01)

(58) Field of Classification Search
CPC ........................................................ F01D 5/147
See application file for complete search history.

(56) References Cited

U.S. PATENT DOCUMENTS

| | | |
|---|---|---|
| 3,834,832 A | 9/1974 | Mallinder et al. |
| 3,861,139 A | 1/1975 | Jones |
| 4,035,550 A | 7/1977 | Suh et al. |
| 4,152,381 A | 5/1979 | Peterson |

(Continued)

FOREIGN PATENT DOCUMENTS

| | | |
|---|---|---|
| CN | 1680684 A | 10/2005 |
| CN | 104105848 B | 8/2016 |

(Continued)

OTHER PUBLICATIONS

Unofficial English Translation of Japanese Office Action issued in connection with corresponding JP Application No. 2014547247 on Aug. 4, 2015.

*Primary Examiner* — Michael L Sehn
(74) *Attorney, Agent, or Firm* — McGarry Bair PC

(57) ABSTRACT

A turbine engine with an engine core defining an engine centerline and comprising a rotor and a stator. The turbine engine including a set of composite airfoils circumferentially arranged about the engine centerline and defining at least a portion of the rotor. An airfoil in the set of composite airfoils including a composite portion extending chordwise between a composite leading edge and a trailing edge and a leading edge protector coupled to the composite portion.

20 Claims, 15 Drawing Sheets

(56) References Cited

U.S. PATENT DOCUMENTS

| | | |
|---|---|---|
| 4,197,756 A | 4/1980 | Yaros |
| 4,452,565 A | 6/1984 | Monhardt et al. |
| 4,815,940 A | 3/1989 | LeShane et al. |
| 5,246,520 A | 9/1993 | Scanlon et al. |
| 5,437,538 A | 8/1995 | Mitchell |
| 5,725,355 A | 3/1998 | Crall et al. |
| 6,139,259 A | 10/2000 | Ho et al. |
| 6,652,222 B1 | 11/2003 | Wojtyczka et al. |
| 7,018,168 B2 | 3/2006 | Worthoff et al. |
| 7,090,463 B2 | 8/2006 | Milburn et al. |
| 7,390,161 B2 | 6/2008 | Xie et al. |
| 7,594,325 B2 | 9/2009 | Read |
| 8,016,543 B2 | 9/2011 | Braley et al. |
| 8,017,188 B2 | 9/2011 | Xie et al. |
| 8,021,102 B2 | 9/2011 | Xie et al. |
| 8,046,915 B2 | 11/2011 | Xie et al. |
| 8,105,042 B2 | 1/2012 | Parkin et al. |
| 8,403,624 B2 | 3/2013 | Xie et al. |
| 8,419,374 B2 | 4/2013 | Huth et al. |
| 8,573,947 B2 | 11/2013 | Klinetob et al. |
| 8,696,319 B2 | 4/2014 | Naik |
| 8,757,958 B2 | 6/2014 | Lussier |
| 8,814,527 B2 | 8/2014 | Huth et al. |
| 9,032,706 B2 | 5/2015 | Marshall |
| 9,045,991 B2 | 6/2015 | Read et al. |
| 9,248,612 B2 | 2/2016 | Zhu et al. |
| 10,087,766 B2 | 10/2018 | Pope et al. |
| 10,385,870 B2 | 8/2019 | Crall |
| 10,399,664 B2 | 9/2019 | Bowden et al. |
| 10,408,072 B2 | 9/2019 | Bielek et al. |
| 10,711,635 B2 | 7/2020 | Worthoff et al. |
| 10,760,428 B2 | 9/2020 | Kray et al. |
| 10,815,886 B2 | 10/2020 | Kroger et al. |
| 10,844,725 B2 | 11/2020 | Pouzadoux et al. |
| 10,913,133 B2 | 2/2021 | Bales et al. |
| 11,131,314 B2 | 9/2021 | Welch |
| 11,655,768 B2 | 5/2023 | Sibbach et al. |
| 11,725,526 B1 | 8/2023 | Sibbach et al. |
| 11,739,689 B2 | 8/2023 | Sibbach et al. |
| 11,913,346 B2 | 2/2024 | Worthoff et al. |
| 2006/0093847 A1 | 5/2006 | Hornick et al. |
| 2008/0145215 A1 | 6/2008 | Finn et al. |
| 2008/0185874 A1 | 8/2008 | Kimoto et al. |
| 2009/0155044 A1 | 6/2009 | Xie et al. |
| 2009/0226310 A1 | 9/2009 | Finn et al. |
| 2010/0150696 A1 | 6/2010 | Lenk |
| 2010/0196654 A1 | 8/2010 | Maheshwari |
| 2012/0251305 A1 | 10/2012 | McMillan |
| 2014/0112796 A1 | 4/2014 | Kray et al. |
| 2015/0151485 A1 | 6/2015 | Godon et al. |
| 2015/0267556 A1 | 9/2015 | Thomas |
| 2016/0010468 A1 | 1/2016 | Kray et al. |
| 2017/0198714 A1 | 7/2017 | Lin et al. |
| 2021/0108572 A1 | 4/2021 | Khalid et al. |
| 2021/0324752 A1 | 10/2021 | Theertham et al. |
| 2021/0388726 A1 | 12/2021 | Churcher et al. |
| 2023/0003133 A1 | 1/2023 | Gondre et al. |
| 2023/0060010 A1 | 2/2023 | Sibbach et al. |
| 2023/0258134 A1 | 8/2023 | Sibbach et al. |
| 2023/0407754 A1 | 12/2023 | De Carne-Carnavalet |

FOREIGN PATENT DOCUMENTS

| | | |
|---|---|---|
| CN | 105814285 B2 | 11/2018 |
| CN | 113123834 B | 9/2021 |
| CN | 216009013 U | 3/2022 |
| EP | 2070689 A2 | 6/2009 |
| FR | 3102378 B1 | 11/2021 |
| FR | 3116560 B1 | 6/2023 |
| JP | 2002020459 A | 1/2002 |
| JP | 2003082072 A | 3/2003 |
| JP | 2003261381 A | 9/2003 |
| JP | 2006177364 A1 | 5/2011 |
| JP | 2011088363 A | 5/2011 |

TURBINE ENGINE WITH COMPOSITE
AIRFOILS

CROSS-REFERENCE TO RELATED APPLICATION(S)

This application is a continuation-in-part of U.S. application Ser. No. 18/741,419, filed Jun. 12, 2024, now allowed, which is a continuation in part of U.S. application Ser. No. 18/171,533, filed Feb. 20, 2023, now U.S. Pat. No. 12,158,082, which is incorporated herein by reference in its entirety.

TECHNICAL FIELD

The disclosure generally relates to a component for a turbine engine, more specifically, to a composite airfoil.

BACKGROUND

Composite materials typically include a fiber-reinforced matrix and exhibit a high strength to weight ratio. Due to the high strength-to-weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
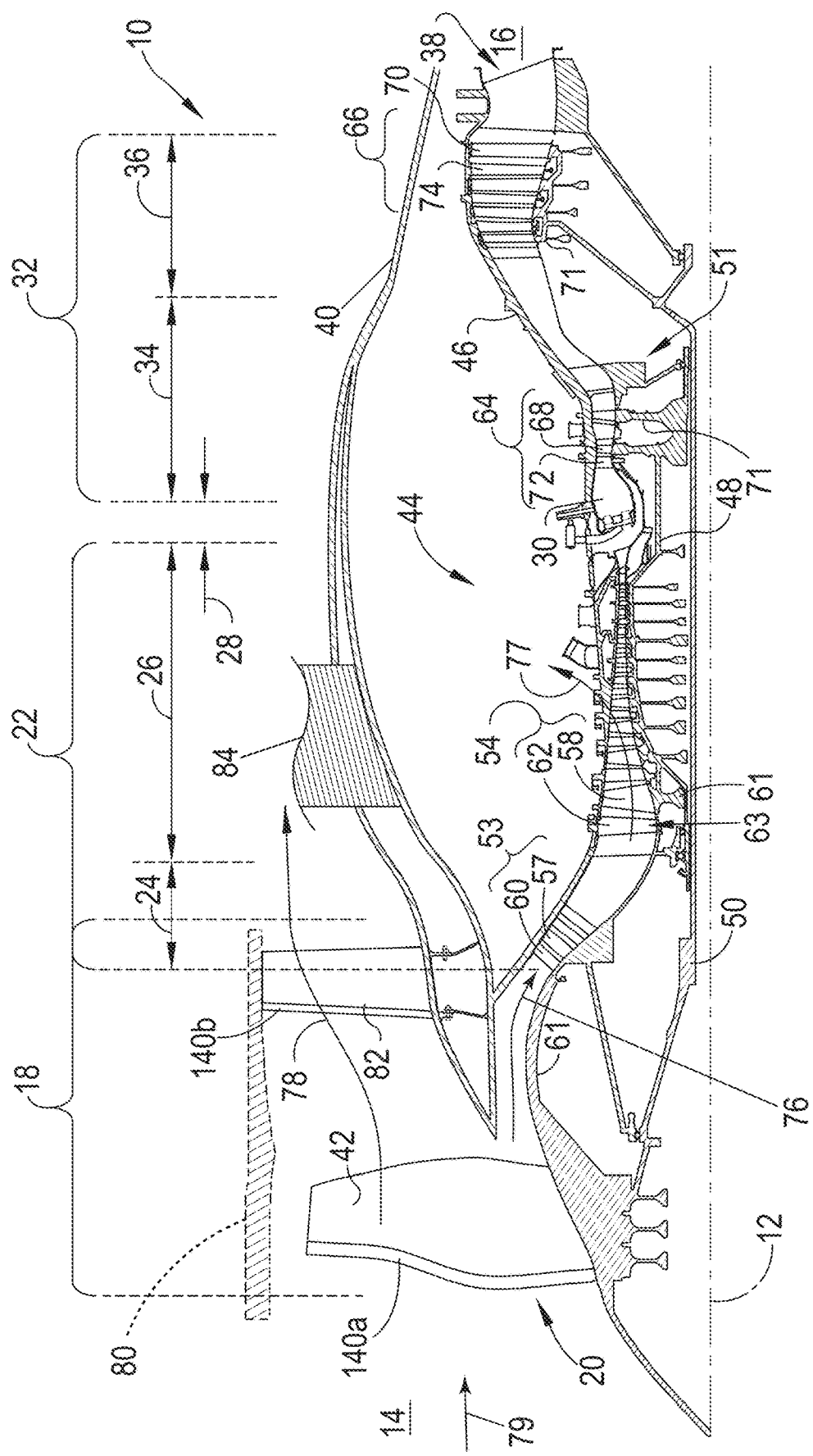
FIG. 1 is a schematic cross-sectional view of a turbine engine in accordance with an exemplary embodiment of the present disclosure.

Aspects of the disclosure herein are directed to a plurality of composite airfoil stages. For purposes of illustration, the present disclosure will be described with respect to the plurality of composite airfoil stages within an engine being a first stage of airfoils in the form of fan blades and a second stage of airfoils immediately downstream the first stage of airfoils as an outlet guide vane (OGV). While fan blades and OGVs are illustrated, it should be understood that any consecutive sets of stages are contemplated. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail to composite fan blades and composite OGVs, one or more examples of which are illustrated in the accompanying drawings. The detailed description uses numerical and letter designations to refer to features in the drawings.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC-SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al2O_3 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "primary impact region" or "primary impact zone" as used herein indicates a region extending both axially and circumferentially around the inner surface of a composite core where a fan blade is most likely to be ejected from the fan assembly.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Leading length or "LL" as used herein refers to a length between a leading edge of the airfoil and a seam between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord length or "CL" as used herein refers to a length between a leading edge of the airfoil and a trailing edge of the airfoil.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, a turbine engine defining a centerline and a circumferential direction is provided. The turbine engine may generally include a turbomachine and a rotor assembly. The rotor assembly may be driven by the turbomachine. The turbomachine, the rotor assembly, or both may define a substantially annular flow path relative to the centerline of the turbine engine. In certain aspects of the present disclosure, an unducted or open rotor turbine engine includes a set of circumferentially spaced fan blades, which extend, exteriorly, beyond a nacelle encasing or engine core.

The turbine engine includes airfoils in the form of blades and vanes. The airfoils described herein can be a plurality of airfoils provided circumferentially about the centerline or be partially provided about a portion of the centerline. At least one airfoil in the plurality of airfoils includes a protective covering on a leading edge of the airfoil. The protective covering can be a metal covering. The protective covering is referred to herein as leading edge protector.

The leading edge protector can be designed for various flight conditions, including take off, descent, and idle. The objective, when designing an airfoil, specifically a composite fan blade and a composite outlet guide vane can be generally stated as balancing an added weight component from the protective covering, or sheath, on the leading edge with an acceptable amount of protection of the leading edge. The balancing of efficient weight designs can be particularly important in large turbofan applications of traditional direct drive, gear-reduction designs, and open-rotor designs. Key factors to consider include that the ratio of the leading edge chord to the blade chord is a balance between the leading edge dominating the response to a bird ingestion or similar event, and the PMC airfoil dominating the characteristics of the blade aerodynamics in normal operation.

There is a tradeoff between the percent of the airfoil chord that is covered by the leading edge protector, and the performance of the airfoil. The protective covering provides a stiffness to the airfoil for bird ingestion, but the remainder of the blade is desirable to be flexible for aerodynamic purposes. Because the fan blade rotates and the OGV is stationary the dynamics of a bird ingestion event differs for the two airfoils.

The inventors have determined that the leading edge protector must overlap with enough of the composite airfoil in order to provide a strong enough bond, but it is desirable to minimize the overlap in order for the composite blade to flex. The leading edge protector also provides erosion protection to a composite airfoil and is required for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the OGV is not rotating, and experiences a different stress when impacted by a bird after it has passed through the fan. Multiple simulations and analyses depending on how the bird strikes the fan, whether it hits directly centered on a leading edge protector or hits between two adjacent blades where it is more likely to pass through without being sliced into smaller pieces. The relationship between the percent chord of a rotating and non-rotating blade that is covered by the leading edge protector is not obvious due to the difference in the forces acting upon the airfoils when struck by a bird or similar object.

The inventors' practice has proceeded in the manner of designing airfoil stages, modifying the airfoil stages with the addition of the leading edge protector, and redesigning the airfoil stages with the leading edge protector meeting protection requirements associated with the airfoil stages. After calculating and checking an amount of protection provided and an amount of weight increase or decreases associated with the leading edge protector, the process is repeated for other stages of during the design of several different types of turbomachines, such as those shown in FIG. 1. In other words, an airfoil design can meet performance requirements for one location in the engine, but not necessarily for another location.

FIG. 1 is a schematic cross-sectional diagram of a turbine engine 10 for an aircraft. By way of non-limiting example the turbine engine 10 is illustrated as an open rotor turbine engine. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42, and a set of outlet guide vanes (OGV) 82 downstream the set of fan blades 42, both disposed radially about the engine centerline 12. The turbine engine 10 includes any number of one or more sets of rotating blades or propellers (e.g., the set of fan blades 42) disposed upstream of a set of stationary fan vanes (e.g., the set of OGVs 82). As a non-limiting example, the turbine engine 10 can include multiple sets of rotating blades and stationary vanes. The set of fan blades 42 can include a first leading edge protector 140a and the set of OGVs 82 can include a second leading edge protector 140b. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28. In some aspects of the disclosure herein, the turbine engine can include a fan casing 80 (shown in dotted line) surrounding the fan 20 to define a ducted turbine engine.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP spools 48 and the LP spool 50 are rotatable about the engine centerline 12 and couple to a set of rotatable elements, which collectively define a rotor 51.

It will be appreciated that the turbine engine 10 is either a direct drive or an integral drive engine utilizing a reduction gearbox coupling the LP shaft or spool 50 to the fan 20.

The LP compressor 24 and the HP compressor 26, respectively, include a set of compressor stages 53, 54, in which a set of compressor blades 57, 58 rotate relative to a corresponding set of static compressor vanes 60, 62 (also called a nozzle) to compress or pressurize the stream of fluid passing through the stage. In a single compressor stage 53, 54, multiple compressor blades 57, 58 are provided in a ring and extend radially outward relative to the engine centerline 12, from a blade platform to a blade tip, while the corresponding static compressor vanes 60, 62 are positioned upstream of and adjacent to the compressor blades 57, 58. It is noted that the number of blades, vanes, and compressor stages shown in FIG. 1 were selected for illustrative purposes only, and that other numbers are possible.

The compressor blades 57, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outward relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are mounted to the engine casing 46 in a circumferential arrangement. The compressor blades 57, 58 and the turbine blades 68, 70 described herein can be part of a blisk, rather than being mounted to a disk.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated portion. For example, the nacelle 40 extends axially forward such that a portion of the nacelle 40 overlays or covers a portion of the fan section 18 or a booster section (not illustrated) of the turbine engine 10. A pylon 84 mounts the turbine engine 10 to an exterior structure (e.g., a fuselage of an aircraft, a wing, a tail wing, etc.).

During operation of the turbine engine 10, a freestream airflow 79 flows against a forward portion of the turbine engine 10. A portion of the freestream airflow 79 becomes an inlet airflow 78. The inlet airflow 78 flows through the set of fan blades 42 and over the nacelle 40 of the turbine engine 10. Subsequently, the inlet airflow 78 flows over at least a portion of the set of OGVs 82, which directs the inlet airflow 78 such that it is transverse toward the engine centerline 12. The inlet airflow 78 then flows past the set of OGVs 82, following the curvature of the nacelle 40 and toward the exhaust section 38.

A portion of the freestream airflow 79 enters the engine core 44 after flowing through the set of fan blades 42 and is described as a working airflow 76, which is used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed 77 air (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
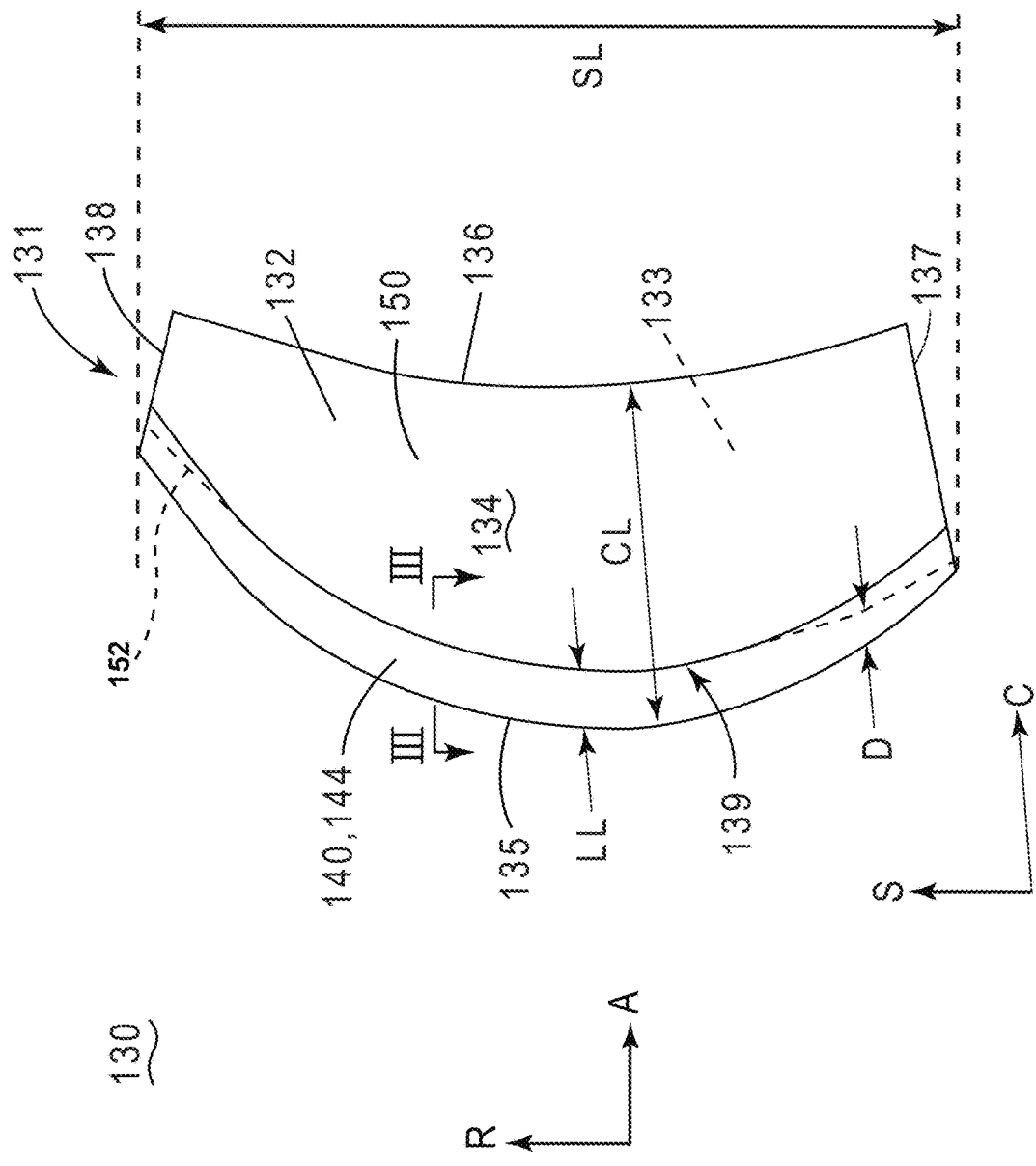
FIG. 2 is a schematic illustration of a composite airfoil in the form of a fan blade for the turbine engine of FIG. 1 according to an exemplary embodiment of the present disclosure.

FIG. 2 is schematic illustration of a composite airfoil 130 in the form of, by way of non-limiting example, a fan blade 131. The fan blade 131 can be, by way of non-limiting example, a blade of the set of fan blades 42 or a blade from the compressor blades 57, 58 or the turbine blades 68, 70. Further, the composite airfoil 130 can be a vane of the set of OGVs 82 or a vane of the static vanes 60, 62, 72, 74. It is contemplated that the composite airfoil 130 can be a blade, vane, airfoil, or other component of any turbine engine, such as, but not limited to, a gas turbine engine, a turboprop engine, a turboshaft engine, or a turbofan engine.

The composite airfoil 130 can include a wall 132 bounding an interior 133. The wall 132 can define an exterior surface 134 extending radially between a leading edge 135 and a trailing edge 136 to define a chordwise direction (denoted "C"). The composite airfoil 130 has a chord length (denoted "CL") measured along the chordwise direction C between the leading edge 135 and the trailing edge 136. The exterior surface 134 can further extend between a root 137 and a tip 138 to define a spanwise direction (denoted "S"). The composite airfoil 130 has a span length (denoted "SL") measured along the spanwise direction S between the root 137 and the tip 138 where the root is considered 0% of the span length SL and the tip 138 is considered 100% of the span length SL. The span length SL is the maximum distance between the root 137 and the tip 138 of the composite airfoil 130. It will be understood that the composite airfoil 130 can take any suitable shape, profile, or form including that the leading edge 135 need not be curved.

An axial direction (denoted "A") extends generally across the page from right to left. The axial direction A is parallel to the engine centerline 12 (FIG. 1). A radial direction (denoted "R") extends perpendicularly away from the axial direction A. It should be understood that the spanwise direction S is parallel to the radial direction R. The chordwise direction C can extend generally along the axial direction A, however with more bend in the composite airfoil 130, it should be understood that the chordwise direction C can extend both into and out of the page and across the page from left to right.

The exterior surface 134 is defined by a leading edge protector 140 and a composite portion 150. A seam 139 separates the leading edge protector 140 from the composite portion 150 along the exterior surface 134. The leading edge protector 140 extends along the chordwise direction C between the leading edge 135 and the seam 139 to define a leading length (denoted "LL").

The leading edge protector 140 is typically a metallic leading edge protector and can be made of, but is not limited to, steel, aluminum, refractory metals such as titanium, or superalloys based on nickel, cobalt, or iron. It should be understood that the leading edge protector 140 for the fan blade 131 can be a metallic leading edge protector while a set of stationary vanes downstream from the fan blade 131, by way of non-limiting example the set of OGVs 82 (FIG. 1), have the second leading edge protector 140*b* (FIG. 1) made of a polyurethane material. Further, the leading edge protectors 140, 140*a,* 140*b* described herein can be any suitable material such as metal, thermoplastic, or polyurethane, where both are the same, or different.

The composite portion 150 can include a composite leading edge 152 spaced a distance (denoted "D") from the leading edge 135. The composite leading edge 152 can define at least a portion of, or all of the seam 139. It is further contemplated that at least a part of the leading edge protector 140 overlaps the composite portion 150 such that at least a portion of, illustrated in dashed line, or all of the composite leading edge 152 is located upstream from the seam 139. In other words, the leading edge protector 140 can define a sheath 144 on the composite leading edge 152.

The composite portion 150 can be made of one or more layers of material. The one or more layers of material can be applied during the same stage or different stages of the manufacturing of the composite airfoil 130. By way of non-limiting example, composite portion 150 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 140 and the composite portion 150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF". In other words, for any given composite airfoil 130 having a predetermined chord length CL, an amount of coverage provided by the leading edge protector 140 increases, so does the leading length LL and in turn the APF.

Figure 3:
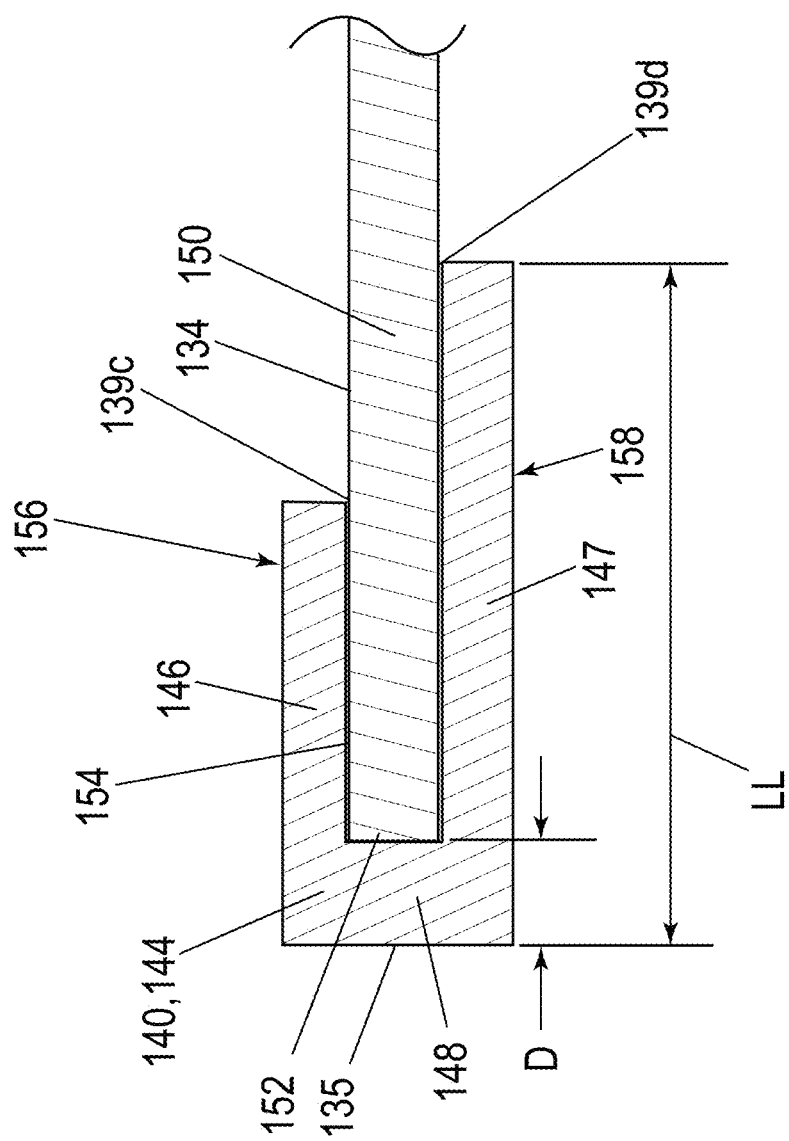
FIG. 3 is a schematic cross-section taken along line III-III of FIG. 2.

FIG. 3 is a schematic cross-section taken along line III-III of FIG. 2. The leading edge protector 140 is the sheath 144 with a first wall 146, a second wall 147, and a third wall 148 interconnecting the first wall 146 and the second wall 147. The first wall 146, second wall 147, and third wall 148 of the leading edge protector 140 are oriented and shaped such that they define a generally U-shaped (or C-shaped) channel 154 therebetween. As shown in FIG. 3 and as will be discussed below, the channel 154 is sized and shaped to receive the composite leading edge 152 of the composite portion 150. Notably, the shape of the channel 154 is shown by way of example only and the channel 154 is not limited to this specific shape and is not drawn to scale.

The composite airfoil 130 can extend between a first side 156 and a second side 158. The seam 139 can be two seams 139*c,* 139*d* at corresponding ends of the channel 154. The leading length LL is measured from the leading edge 135 to the seam 139*d* furthest from the leading edge 135. While illustrated at two different locations, it should be understood that the seams 139*c,* 139*d* can be located at the same leading length LL. While illustrated as rectangular blunt ends at the seam 139, the leading edge protector 140 can taper such that the leading edge protector 140 and the composite portion 150 are flush to define the exterior surface 134.

Figure 4:
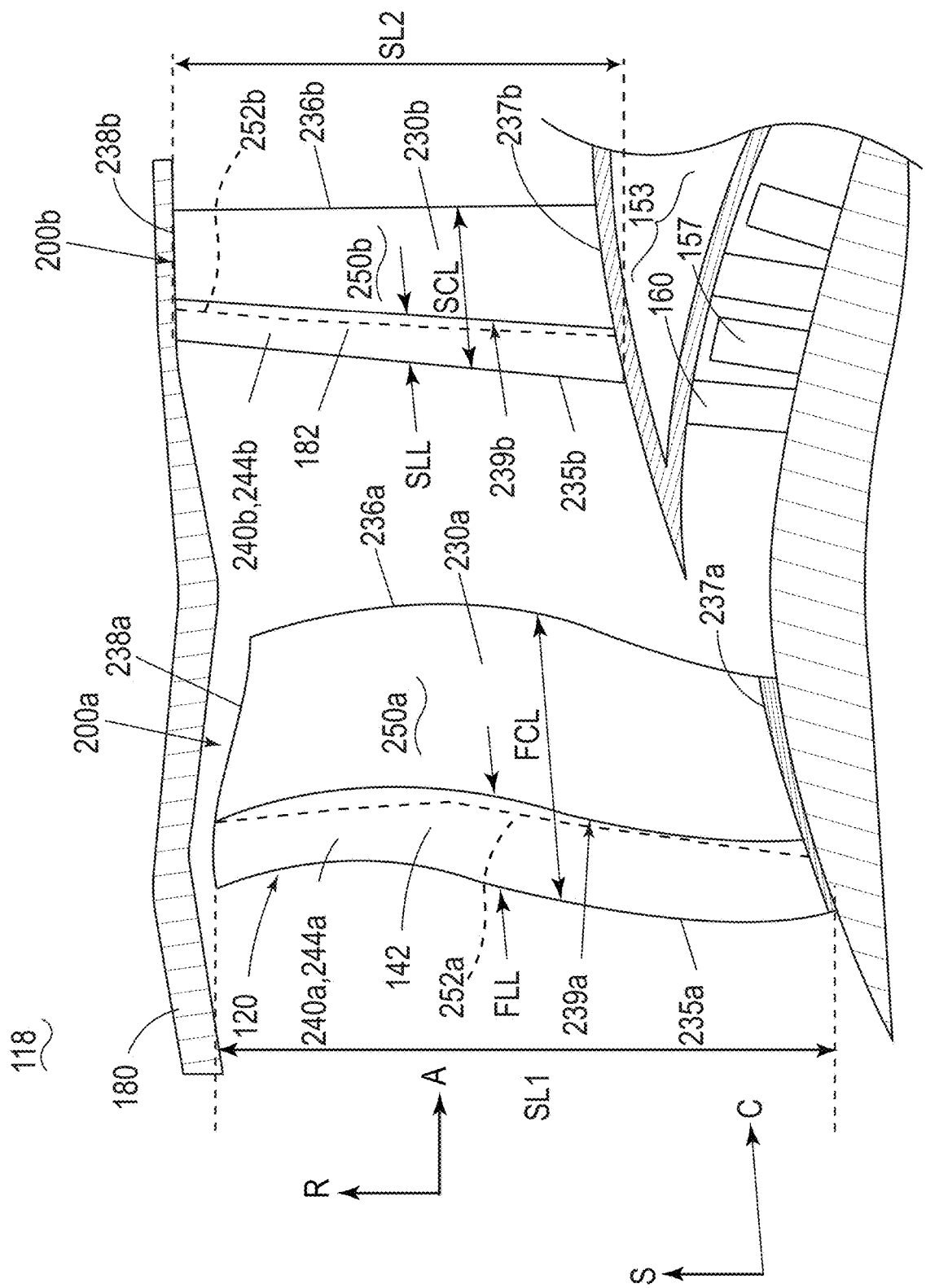
FIG. 4 is a schematic enlarged view of an exemplary fan section for the turbine engine of FIG. 1 according to an exemplary embodiment of the present disclosure.

FIG. 4 is schematic enlarged view of a fan section 118 similar to fan section 18 therefore, like parts of the fan section 118 (FIG. 1) will be identified with like numerals increased by 100, with it being understood that the description of the like parts of the fan section 18 applies to the fan section 118, except where noted.

A set of compressor stages 153 include a set of compressor blades 157 rotating relative to a corresponding set of static compressor vanes 160. A set of fan blades 142 define a fan section 118 including a fan 120. The turbine engine can include a fan casing 180 surrounding the fan 120.

The set of fan blades 142 defines a first stage of airfoils 200a within the fan section 118 (FIG. 1). A first airfoil 230a in the first stage of airfoils 200a is similar to the previously described airfoil 130, therefore like parts of the first airfoil 230a will be identified with like numerals increased by 100 and having a notation "a" with it being understood that the description of the like parts of the airfoil 130 applies to the first airfoil 230a, except where noted. While only a single fan blade is shown in the cross-section it will be understood that that the set of fan blades 142 are included and spaced about the fan section 118.

The first airfoil 230a has a first span length (denoted "SL1") measured along the spanwise direction S between a first root 237a and a first tip 238a where the first root 237a is considered 0% of the first span length SL1 and the first tip 238a is considered 100% of the first span length SL1. The first span length SL1 is the maximum distance between the first root 237a and the first tip 238a of the first airfoil 230a.

A first leading edge protector 240a extends along the chordwise direction C between a first leading edge 235a and a first seam 239a to define a first leading length (denoted "FLL"). The first airfoil 230a has a first chord length (denoted "FCL") measured along the chordwise direction C between the first leading edge 235a and the first trailing edge 236a.

A relationship between the first leading length (FLL) and the first chord length (FCL) is denoted herein with a first expression of the APF:

$$APF1 = \frac{FLL}{FCL} \quad (1)$$

OGVs 182 define a second stage of airfoils 200b downstream from the first stage of airfoils 200a. A second airfoil 230b in the second stage of airfoils 200b is similar to the previously described airfoil 130, therefore like parts of the second airfoil 230b will be identified with like numerals increased by 100 and having a notation "b" with it being understood that the description of the like parts of the airfoil 130 applies to the second airfoil 230b, except where noted. The second airfoil 230b is located downstream from the first airfoil 230a. While only a single outlet guide vane 182 is shown in the cross-section it will be understood that the OGVs 182 are multiple OGVs spaced about the fan section 118.

A second leading edge protector 240b extends along the chordwise direction C between a second leading edge 235b and a second seam 239b to define a second leading length (denoted "SLL"). The second airfoil 230b has a second chord length (denoted "SCL") measured along the chordwise direction C between the second leading edge 235b and second trailing edge 236b.

The second airfoil 230b has a second span length (denoted "SL2") measured along the spanwise direction S between a second root 237b and a second tip 238b where the second root 237b is considered 0% of the second span length SL2 and the second tip 238b is considered 100% of the second span length SL2. The second span length SL2 is the maximum distance between the second root 237b and the second tip 238b of the second airfoil 230b.

The first and second leading edge protectors 240a, 240b can each define first and second sheaths 244a, 244b. An exterior surface of each airfoil 230a, 230b is defined by the corresponding leading edge protectors 240a, 240b and a corresponding composite portion 250a, 250b. The composite portions 250a, 250b can each include a corresponding composite leading edge 252a, 252b which can define at least a portion of, or all of the corresponding seams 239a, 239b.

A relationship between the second leading length (SLL) and the second chord length (SCL) is denoted herein with a second expression of the APF:

$$APF2 = \frac{SLL}{SCL} \quad (2)$$

As will be further discussed herein, the APF describes an amount of protection coverage by the leading edge protector of any of the airfoils 130, 230a, 230b described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 200a has a first number of airfoils and the second stage of composite airfoils 200b has a second number of airfoils different than the second number. In other words, the consecutive stages of airfoils can vary in size and number of airfoils. Further, the first stage of composite airfoils 200a and the second stage of composite airfoils 200b can both be configured to rotate.

It will be appreciated that the number, size, and configuration of the composite airfoils described herein are provided by way of example only and that in other exemplary embodiments, the composite airfoils may have any other suitable configuration including that the plurality of airfoils may be in multiple rotor stages, etc.

As described earlier, finding a workable solution that balances the amount of protective covering for the composite airfoil as described herein whilst maintaining a weight requirement is a labor-intensive and time-intensive process, because the process is iterative and involves the selection of multiple composite airfoils with various protector edge lengths and chord lengths. Design procedures require placing said composite airfoil 130 (FIG. 2) into a turbine engine designed for a first flight operating condition and embodying a protection effectiveness with acceptable weight gain/losses for that first flight operating condition. Evaluating whether in a second, third, or other flight operating condition, the same selected composite airfoil 130 maintains a heat effectiveness with acceptable protection effectiveness for the other operating conditions is time-intensive and necessitates re-design of the composite airfoil and even the turbine engine in the event the conditions are not met. It is desirable to have an ability to arrive at an optimal composite airfoil, like the composite airfoil(s) described herein, rather than relying on chance. It would be desirable to have a limited or narrowed range of possible composite airfoil configurations for satisfying mission requirements, such requirements including protection, weight restrictions, heat transfer, pressure ratio, and noise transmission level requirements, as well as the ability to survive bird strikes at the time a composite airfoil 130 is selected and located within an engine.

The inventor(s) sought to find the trade-off balance between leading edge protection and weight gain/loss while satisfying all design requirements, because this would yield a more desired composite airfoil suited for specific needs of the engine, as described above. Knowing these trade-offs is also a desirable time saver.

TABLE 1 below illustrates some composite airfoil configurations that yielded workable solutions to the trade-off balance problem.

TABLE 1

| Example: | 1 | 2 | 3 | 4 | 5 | 6 |
|---|---|---|---|---|---|---|
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

It was discovered, unexpectedly, during the course of engine design and the time-consuming iterative process previously described, that a relationship exists between the ratio of the leading length LL to the chord length CL. It has been found that the optimal amount of protective covering of the composite airfoil lies within a specific range based on the leading length LL of the protective covering and the chord length CL of the composite airfoil.

TABLE 2 below illustrates some consecutive composite airfoil stages with workable solutions to the trade-off balance problem. Different span percentages are shown in TABLE 2. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determined APF2.

TABLE 2

| Fan Blade | | | Outlet Guide Vane | | |
|---|---|---|---|---|---|
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | 26 | 30.6 | 3.18 |
| 28 | 50.5 | 13.6 | 32 | 30.0 | 3.18 |
| 32 | 52.4 | 14.2 | 38 | 29.3 | 3.18 |
| 36 | 54.5 | 14.6 | 44 | 28.7 | 3.18 |
| 40 | 56.5 | 15.0 | 50 | 28.1 | 3.18 |
| 44 | 58.2 | 15.3 | 56 | 27.5 | 3.18 |
| 48 | 59.4 | 15.5 | 62 | 26.9 | 3.18 |
| 52 | 60.1 | 15.7 | 68 | 26.6 | 3.18 |
| 56 | 60.6 | 15.6 | 74 | 26.7 | 3.18 |
| 60 | 61.0 | 15.7 | 80 | 27.4 | 3.18 |
| 64 | 61.5 | 15.5 | | | |
| 68 | 61.9 | 15.4 | | | |
| 72 | 65.0 | 15.4 | | | |
| 76 | 63.2 | 15.5 | | | |
| 80 | 64.4 | 15.7 | | | |

Moreover, utilizing this relationship, the inventor found that the number of suitable or feasible composite airfoil possibilities for placement in a turbine engine that are capable of meeting the design requirements could be greatly reduced, thereby facilitating a more rapid down-selection of composite airfoils to consider as an engine is being developed. Such benefit provides more insight to the requirements for a given engine, and to the requirements for particular composite airfoil locations within the engine, long before specific technologies, integration, or system requirements are developed fully. The discovered relationship also avoids or prevents late-stage redesign while also providing the composite airfoil with a required protection effectiveness within given weight parameters.

More specifically, the inventors found that a relationship between the first expression of the APF, APF1, and the second expression of the APF, APF2, optimizes the protection amount for successive stages of airfoils. This relationship was an unexpected discovery during the course of engine design—i.e., designing multistage airfoil sections such as by way of non-limiting examples fan sections, fan blades, and outlet guide vanes and evaluating the impact that an amount of protection on the fan blade has on a needed amount of protection on the outlet guide vane, or vice versa. Narrowing the options down based on surrounding stages of airfoils can significantly decrease both material and time costs.

In other words, an amount of protection provided by the first leading edge protector 240a on the first airfoil 230a can affect an amount of protection necessary for the second airfoil 230b downstream of the first airfoil 230a. This relationship between the multistage airfoils or successive airfoils, such as 230a and 230b, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \quad (3)$$

More specifically, it was found that for any position between 20% and 80%, inclusive of end points of the span length SL, a desired SPF value is greater than or equal to 0.70 and less than or equal to 4 ($0.7 \leq SPF \leq 4$). The specific range of the span length was chosen because the airfoil may have different properties, profiles, etc. at its distal ends. Conversely, at any position between 20% and 80%, inclusive of end points the airfoil is more uniform and therefore the determined ratios are applicable. It will be understood that because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

Utilizing this relationship, the inventors were able to arrive at a better performing airfoil in terms of protection amount with acceptable weight increase. The inventors found that the SPF for a set first set of airfoils and a second set of airfoils downstream from the first set of airfoils could be narrowed to an SPF range of greater than or equal to 0.95 and less than or equal to 2.5 ($0.95 \leq SPF \leq 2.5$). Narrowing the SPF range provides more insight to the requirements for a given engine well before specific technologies, integration and system requirements are developed fully. For example, as the fan speed is reduced, coverage on the first leading edge 235a by the first leading edge protector can decrease such that the APF1 also decreases. Further, knowing a range for the SPF can prevent or minimize late-stage redesign, decrease material cost, and save time.

The SPF value represents how an amount of protection on a first stage of airfoils, like the first stage of airfoils 200a, impacts an amount of protection necessary for any downstream airfoil stages with respect to the first set of airfoil stages.

In one example, the set of fan blades 142 illustrated in FIG. 4 can have dimensions of the Fan Blade at 20% from TABLE 2 and the set of outlet guide vanes 182 can have dimensions of the Outlet Guide Vane at 20% from TABLE 2. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 142 illustrated in FIG. 4 can have dimensions of the Fan Blade at 68% from TABLE 2 and the set of outlet guide vanes 182 can have dimensions of the Outlet Guide Vane at 68% from TABLE 2. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (3) are provided below in TABLE 3:

TABLE 3

| Parameter | Lower Bound | | Upper Bound | |
|---|---|---|---|---|
| SL (%) | 20 | 80 | 20 | 80 |
| | First Airfoil | | | |
| FCL (cm) | 24 | 32 | 56 | 77 |
| FLL (cm) | 6 | 8 | 13 | 19 |
| | Second Airfoil | | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in TABLE 4 below fit into the composite airfoil dimensions previously described herein. These ranges enable a minimum weight gain for a compact and proficiently protected composite airfoils in succession.

TABLE 4

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils downstream of the first airfoils within the ranges provided can be assembled to conform with any fan section, or other downstream stage relationship for blades/vanes and blades/blades. This can include any number of engine designs including ducted and unducted engines as well as a direct-drive configuration and an indirect-drive configuration such as a speed reduction device or a geared-drive configuration.

Figure 5:
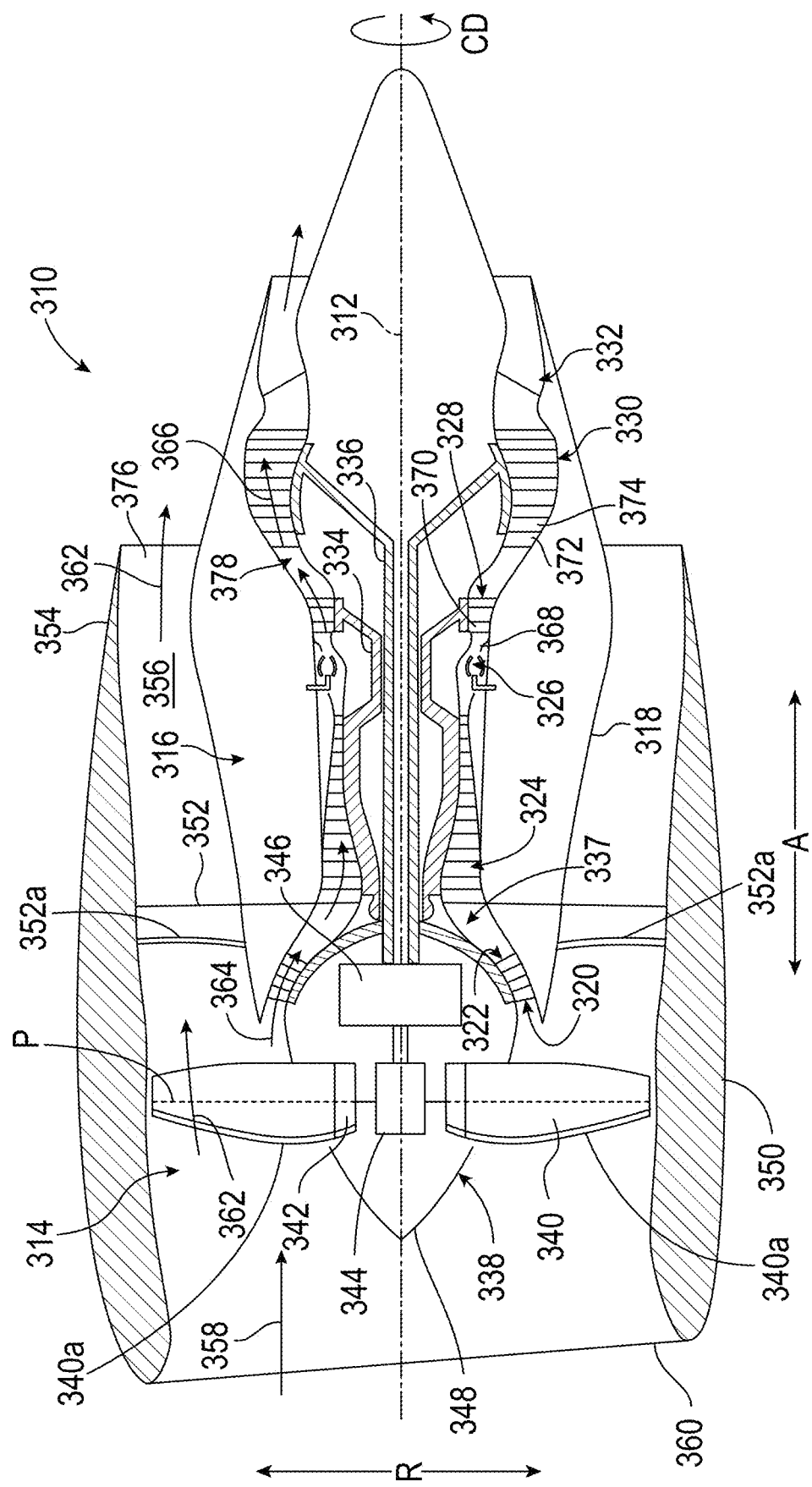
FIG. 5 is a schematic cross-sectional view of a gas turbine engine in accordance with another exemplary embodiment of the present disclosure.

For example, FIG. 5 illustrates a gas turbine engine 310 as a high-bypass turbofan jet engine, sometimes also referred to as a turbofan engine, which can include the set of composite airfoils or first and second stages of composite airfoils as described herein. The gas turbine engine 310 defines an axial direction A (extending parallel to a longitudinal centerline 312 provided for reference), a radial direction R, and a circumferential direction CD extending about the longitudinal centerline 312. In general, the gas turbine engine 310 includes a fan section 314 and a turbomachine 316 disposed downstream from the fan section 314.

The exemplary turbomachine 316 depicted generally includes a substantially tubular outer casing 318 that defines an annular inlet 320. The outer casing 318 encases, in serial flow relationship, a compressor section including a booster or low pressure (LP) compressor 322 and a high pressure (HP) compressor 324, a combustion section 326, a turbine section including a high pressure (HP) turbine 328 and a low pressure (LP) turbine 330, and a jet exhaust nozzle section 332. A high pressure (HP) shaft 334, which may additionally or alternatively be a spool, drivingly connects the HP turbine 328 to the HP compressor 324. A low pressure (LP) shaft 336, which may additionally or alternatively be a spool, drivingly connects the LP turbine 330 to the LP compressor 322. The compressor section, combustion section 326, turbine section, and jet exhaust nozzle section 332 together define a working gas flow path 337.

In the illustrated example, and by way of non-limiting example, the fan section 314 includes a fan 338 having a plurality of fan blades 340 coupled to a disk 342 in a spaced apart manner. As depicted, the fan blades 340 extend outwardly from disk 342 generally along the radial direction R.

Each fan blade 340 is rotatable relative to the disk 342 about a pitch axis P by virtue of the fan blades 340 being operatively coupled to a suitable pitch change mechanism 344 configured to collectively vary the pitch of the fan blades 340, e.g., in unison. The gas turbine engine 310 further includes a speed reduction device in the form of a power gearbox 346, and the fan blades 340, disk 342, and pitch change mechanism 344 are together rotatable about the longitudinal centerline 312 by LP shaft 336 across the power gearbox 346. The power gearbox 346 includes a plurality of gears for adjusting a rotational speed of the fan 338 relative to a rotational speed of the LP shaft 336, such that the fan 338 may rotate at a more efficient fan speed. It will be understood that any suitable speed reduction device configured to adjust the rotation of the fan 338 relative to the LP shaft 336 can be utilized and that a power gearbox is merely one example thereof.

The disk 342 is covered by rotatable front hub 348 of the fan section 314. The front hub 348 is also sometimes referred to as a spinner. The front hub 348 is aerodynamically contoured to promote an airflow through the plurality of fan blades 340.

Additionally, the exemplary fan section 314 includes an annular fan casing or outer nacelle 350 that circumferentially surrounds the fan 338, circumferentially surrounds at least a portion of the turbomachine 316, or a combination thereof. It should be appreciated that the nacelle 350 is supported relative to the turbomachine 316 by a plurality of outlet guide vanes 352, which can be a second stage of airfoils in the non-limiting example. Moreover, a downstream section 354 of the nacelle 350 extends over an outer portion of the turbomachine 316 so as to define a bypass airflow passage 356 therebetween.

It will be understood that each fan blade of the plurality of fan blades 340 may form a composite airfoil and that the plurality of fan blades 340 can form a first stage of airfoils as described above. More specifically, each of the plurality of fan blades 340 can include a first leading edge protector 340a. It will be understood that the plurality of fan blades forming the first stage of airfoils are similar to the previously described airfoils 130 and 230a with it being understood that the description of like parts applies to the plurality of fan blades unless otherwise noted.

Further still, it will be understood that each outlet guide vane of the plurality of outlet guide vanes 352 may form a composite airfoil. Further still, in the illustrated example, the plurality of outlet guide vanes 352 can form a second stage of airfoils as described above. More specifically, each of the plurality of outlet guide vanes 352 can include a second leading edge protector 352a. It will be understood that an outlet guide vane of the plurality of outlet guide vanes 352 forming the second stage of airfoils is similar to the previously described airfoils 130 and 230b with it being understood that the description of like parts applies to the outlet guide vane of the plurality of outlet guide vanes 352 unless otherwise noted.

It will be understood that the plurality of fan blades 340 and the plurality of outlet guide vanes 352 are similar to the previously described first and second airfoil pairs with dimensions fitting in the ranges set out in TABLE 4 above.

During operation of the gas turbine engine 310, a volume of air 358 enters the gas turbine engine 310 through an associated inlet 360 of the nacelle 350 and fan section 314. As the volume of air 358 passes across the fan blades 340, a first portion of air 362 is directed or routed into the bypass airflow passage 356 and a second portion of air 364 as indicated by arrow 364 is directed or routed into the working gas flow path 337, or more specifically into the LP compressor 322. The ratio between the first portion of air 362 and the second portion of air 364 is commonly known as a bypass ratio. A pressure of the second portion of air 364 is then increased as it is routed through the HP compressor 324 and into the combustion section 326, where it is mixed with fuel and burned to provide combustion gases 366.

The combustion gases 366 are routed through the HP turbine 328 where a portion of thermal and/or kinetic energy from the combustion gases 366 is extracted via sequential stages of HP turbine stator vanes 368 that are coupled to the outer casing 318 and HP turbine rotor blades 370 that are coupled to the HP shaft 334, thus causing the HP shaft 334 to rotate, which supports operation of the HP compressor 324. The combustion gases 366 are then routed through the LP turbine 330 where a second portion of thermal and kinetic energy is extracted from the combustion gases 366 via sequential stages of LP turbine stator vanes 372 that are coupled to the outer casing 318 and LP turbine rotor blades 374 that are coupled to the LP shaft 336, thus causing the LP shaft 336 to rotate, which supports operation of the LP compressor 322, rotation of the fan 338, or a combination thereof.

The combustion gases 366 are subsequently routed through the jet exhaust nozzle section 332 of the turbomachine 316 to provide propulsive thrust. Simultaneously, the pressure of the first portion of air 362 is substantially increased as the first portion of air 362 is routed through the bypass airflow passage 356 before it is exhausted from a fan nozzle exhaust section 376 of the gas turbine engine 310, also providing propulsive thrust. The HP turbine 328, the LP turbine 330, and the jet exhaust nozzle section 332 at least partially define a hot gas path 378 for routing the combustion gases 366 through the turbomachine 316.

As previously described the stages of airfoils exemplary gas turbine engine 310 depicted in FIG. 5 is by way of example only, and that in other exemplary embodiments, the gas turbine engine 310 may have other configurations. For example, although the gas turbine engine 310 depicted is configured as a ducted gas turbine engine (i.e., including the outer nacelle 350, also referred to herein as a turbofan engine), in other embodiments, the gas turbine engine 310 may be an unducted gas turbine engine (such that the fan 338 is an unducted fan, and the outlet guide vanes 352 are cantilevered from the outer casing 318; see, e.g., FIG. 6; also referred to herein as an open rotor engine). Additionally, or alternatively, although the gas turbine engine 310 depicted is configured as a variable pitch gas turbine engine (i.e., including a fan 338 configured as a variable pitch fan), in other embodiments, the gas turbine engine 310 may alternatively be configured as a fixed pitch gas turbine engine (such that the fan 338 includes fan blades 340 that are not rotatable about a pitch axis P).

Figure 6:
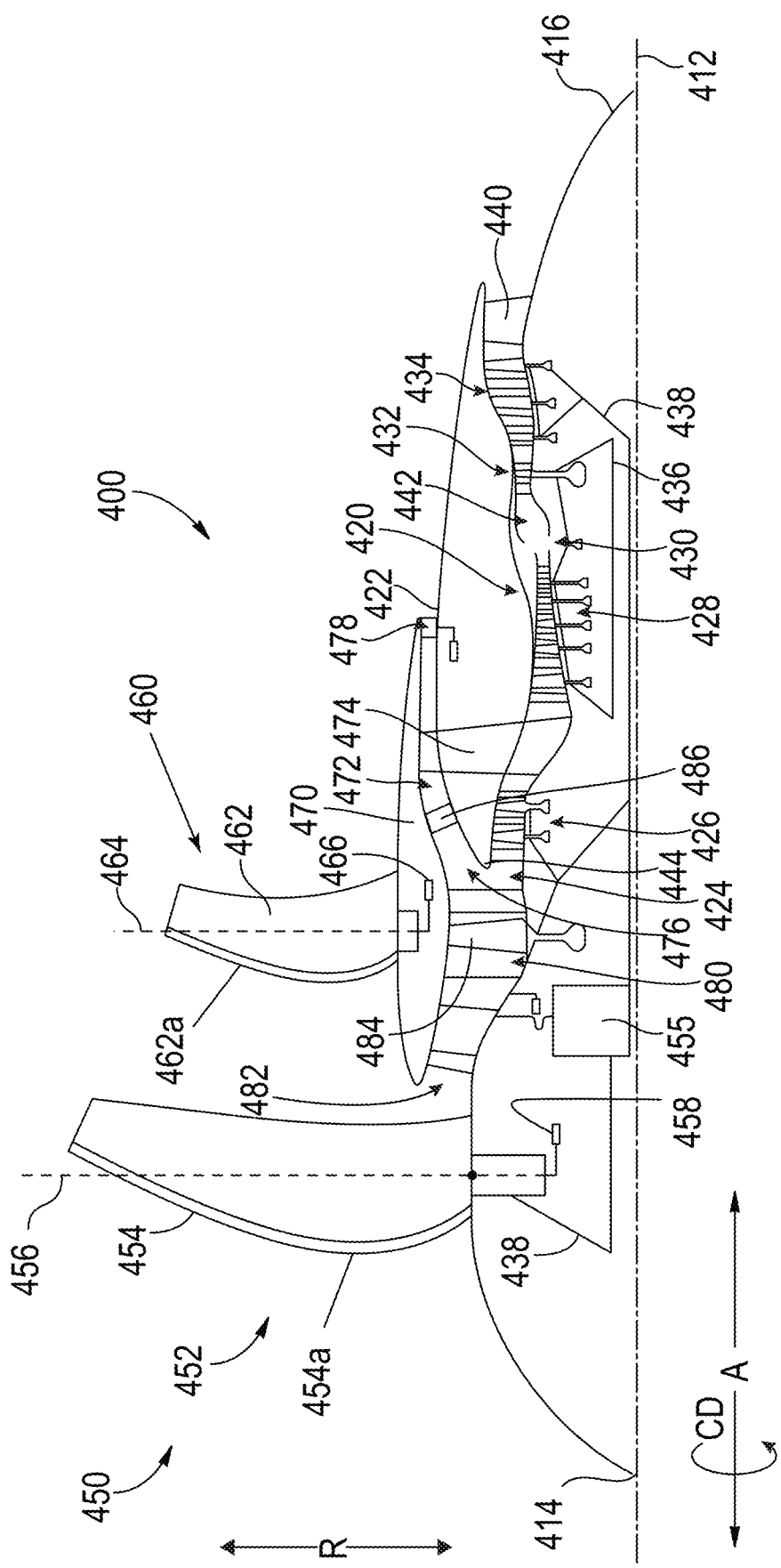
FIG. 6 is a schematic cross-sectional view of a gas turbine engine in accordance with another exemplary embodiment of the present disclosure.

FIG. 6, illustrates another non-limiting example of a gas turbine engine 400, which can include the set of composite airfoils or first and second stages of composite airfoils as described herein. The exemplary gas turbine engine 400 of FIG. 4 may be configured in substantially the same manner as the exemplary gas turbine engine 310 described above with reference to FIG. 5.

For example, the exemplary gas turbine engine 400 defines an axial direction A, a radial direction R, and a circumferential direction CD. Moreover, the engine 400 defines an axial centerline, longitudinal axis or engine centerline 412 that extends along the axial direction A. In general, the axial direction A extends parallel to the engine centerline 412, the radial direction R extends outward from and inward to the engine centerline 412 in a direction orthogonal to the axial direction A, and the circumferential direction CD extends three hundred sixty degrees (360°) around the engine centerline 412. The engine 400 extends between a forward end 414 and an aft end 416, e.g., along the axial direction A.

Further, the exemplary gas turbine engine 400 generally includes a fan section 450 and a turbomachine 420. Generally, the turbomachine 420 includes, in serial flow order, a compressor section, a combustion section, a turbine section, and an exhaust section. In a non-limiting example, the turbomachine 420 includes a core cowl 422 that defines a core inlet 424 that is annular. The core cowl 422 further encloses at least in part a low pressure system and a high pressure system. For example, the core cowl 422 depicted encloses and supports at least in part a booster or low pressure ("LP") compressor 426, a high pressure ("HP") compressor 428, a combustor 430, a high pressure turbine 432, and a low pressure turbine 434. The high pressure turbine 432 drives the high pressure compressor 428 through a high pressure shaft 436. The low pressure turbine 434 drives the low pressure compressor 426 and components of the fan section 450 through a low pressure shaft 438. After driving each of the high pressure turbine 432 and the low pressure turbine 434, combustion products exit the turbomachine 420 through a turbomachine exhaust nozzle 440.

In this manner, the turbomachine 420 defines a working gas flow path or core duct 442 that extends between the core inlet 424 and the turbomachine exhaust nozzle 440. The core duct 442 is an annular duct positioned generally inward of the core cowl 422 along the radial direction R. The core duct 442 may be referred to as a second stream.

The fan section 450 includes a fan 452, which is the primary fan in non-limiting example. One difference is that the fan 452 is an open rotor or unducted fan. In such a manner, the gas turbine engine 400 may be referred to as an open rotor engine. The fan 452 includes fan blades 454, while only a single flan blade is illustrated in FIG. 6 it will be understood that an array of fan blades are included. Moreover, the fan blades 454 can be arranged in equal spacing around the engine centerline 412. Each fan blade 454 has a root and a tip and a span defined therebetween. Each fan blade 454 defines a central blade axis 456. For this embodiment, each fan blade 454 of the fan 452 is rotatable about its central blade axis 456, e.g., in unison with one another. One or more actuators 458 are provided to facilitate such rotation and therefore may be used to change a pitch of the fan blades 454.

The fan blades 454 are rotatable about the engine centerline 412. As noted above, the fan 452 is drivingly coupled with the low pressure turbine 434 via the LP shaft 438. In a non-limiting example, the fan 452 is coupled with the LP shaft 438 via a speed reduction device, which can include by way of non-limiting examples a power gearbox or a speed reduction gearbox 455, e.g., in an indirect-drive or geared-drive configuration.

The fan section 450 further includes a fan guide vane array 460 that includes fan guide vanes 462, again while only one fan guide vane is shown in FIG. 6 it will be understood that the fan guide vanes 462 are disposed around the engine centerline 412. The fan guide vanes 462 are mounted to the fan cowl 470. In a non-limiting example, the fan guide vanes 462 are not rotatable about the engine centerline 412. Each of the fan guide vanes 462 has a root and a tip and a span defined therebetween. The fan guide vanes 462 may be unshrouded as shown in FIG. 6 or, alternatively, may be shrouded, e.g., by an annular shroud spaced outward from the tips of the fan guide vanes 462 along the radial direction R or attached to the fan guide vanes 462.

Each fan guide vane 462 defines a central blade axis 464. By way of non-limiting example, each of the fan guide vanes 462 of the fan guide vane array 460 is rotatable about its respective central blade axis 464, e.g., in unison with one another. One or more actuators 466 are provided to facilitate such rotation and therefore may be used to change a pitch of the fan guide vane 462 about its respective central blade axis 464. However, in other embodiments, each of the fan guide vanes 462 may be fixed or unable to be pitched about its central blade axis 464.

It will be understood that each of the fan blades 454 may form a composite airfoil and that the fan blades 454 can form a first stage of airfoils as described above. More specifically, each of the fan blades 454 can include a first leading edge protector 454a. It will be understood that the fan blades 454 forming the first stage of airfoils are similar to the previously described airfoils 130, 230a, and 340 with it being understood that the description of like parts applies to the fan blades unless otherwise noted.

Further still, it will be understood that each of the fan guide vanes 462 may form a composite airfoil. Further still, in the illustrated example, the fan guide vanes 462 can form a second stage of airfoils as described above. More specifically, each of the fan guide vanes 462 can include a second leading edge protector 462a. It will be understood that the fan guide vanes 462 forming the second stage of airfoils is similar to the previously described airfoils 130, 230b, and 352 with it being understood that the description of like parts applies to the fan guide vanes 462 unless otherwise noted.

It will be understood that the fan blades 454 and the fan guide vanes 462 are similar to the previously described first and second airfoil pairs with dimensions fitting in the ranges set out in TABLE 4 above.

Another difference is that the illustrated example in FIG. 6, in addition to the unducted fan 452, shows a ducted fan 484 included aft of the fan 452. In this manner, the engine 400 includes both a ducted fan 484 and an unducted fan 452, which both serve to generate thrust through the movement of air without passage through at least a portion of the turbomachine 420 (e.g., without passage through the HP compressor 428 and combustion section for the embodiment depicted). The ducted fan 484 is rotatable about the engine centerline 412. The ducted fan 484 is, by way of non-limiting example, driven by the low pressure turbine 434 (e.g. coupled to the LP shaft 438). The fan 452 may be referred to as the primary fan, and the ducted fan 484 may be referred to as a secondary fan. It will be appreciated that these terms "primary" and "secondary" are terms of convenience, and do not imply any particular importance, power, or the like.

The ducted fan 484 includes a plurality of fan blades (not separately labeled in FIG. 6) arranged in a single stage, such that the ducted fan 484 may be referred to as a single stage fan. The fan blades of the ducted fan 484 can be arranged in equal spacing around the engine centerline 412. Each blade of the ducted fan 484 has a root and a tip and a span defined therebetween.

The fan cowl 470 annularly encases at least a portion of the core cowl 422 and is generally positioned outward of at least a portion of the core cowl 422 along the radial direction R. Particularly, a downstream section of the fan cowl 470 extends over a forward portion of the core cowl 422 to define a fan duct flowpath, or simply a fan duct 472. The fan flowpath or fan duct 472 may be understood as forming at least a portion of the third stream of the engine 400.

Incoming air may enter through the fan duct 472 through a fan duct inlet 476 and may exit through a fan exhaust nozzle 478 to produce propulsive thrust. The fan duct 472 is an annular duct positioned generally outward of the core duct 442 along the radial direction R. The fan cowl 470 and the core cowl 422 are connected together and supported by a plurality of substantially radially extending, circumferentially-spaced stationary struts 474 (only one of which is shown in FIG. 6). The stationary struts 474 may each be aerodynamically contoured to direct air flowing thereby. Other struts in addition to the stationary struts 474 may be used to connect and support the fan cowl 470, the core cowl 422, or a combination thereof. In many embodiments, the fan duct 472 and the core duct 442 may at least partially co-extend axially on opposite radial sides of the core cowl 422. For example, the fan duct 472 and the core duct 442 may each extend directly from a leading edge 444 of the core cowl 422 and may partially co-extend generally axially on opposite radial sides of the core cowl 422.

The engine 400 also defines or includes an inlet duct 480. The inlet duct 480 extends between the engine inlet 482 and the core inlet 424, the fan duct inlet 476, or a combination thereof. The engine inlet 482 is defined generally at the forward end of the fan cowl 470 and is positioned between the fan 452 and the fan guide vane array 460 along the axial direction A. The inlet duct 480 is an annular duct that is positioned inward of the fan cowl 470 along the radial direction R. Air flowing downstream along the inlet duct 480 is split, not necessarily evenly, into the core duct 442 and the fan duct 472 by a fan duct splitter or leading edge 444 of the core cowl 422. In the embodiment depicted, the inlet duct 480 is wider than the core duct 442 along the radial direction R. The inlet duct 480 is also wider than the fan duct 472 along the radial direction R.

Air passing through the fan duct 472 may be relatively cooler than one or more fluids utilized in the turbomachine 420. In this way, one or more heat exchangers 486 may be positioned in thermal communication with the fan duct 472. For example, one or more heat exchangers 486 may be disposed within the fan duct 472 and utilized to cool one or more fluids from the core engine with the air passing through the fan duct 472, as a resource for removing heat from a fluid, e.g., compressor bleed air, oil or fuel. The heat exchanger 486 may be an annular heat exchanger.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

It will be understood that a speed reduction device including, but not limited to, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

Benefits associated with the SPF described herein include a quick assessment of design parameters in terms of composite airfoils in downstream relationship. Further, the SPF described herein enables a quick visualization of tradeoffs in terms of geometry that are bounded by the constraints imposed by the materials used, the available space in which the composite airfoils are located, the type of turbine engine or system enclosures and the configuration of surrounding components, or any other design constraint. The SPF enables the manufacturing of a high performing composite airfoil with peak performance with the factors available. While narrowing these multiple factors to a region of possibilities saves time, money, and resources, the largest benefit is at the system level, where the composite airfoils described herein enable improved system performance. Previously developed composite airfoils may peak in one area of performance by design, but lose efficiency or lifetime benefits in another area of performance. In other words, the stage performance factor enables the development and production of higher performing composite airfoils across multiple performance metrics within a given set of constraints.

As will be appreciated from the description above, an airfoil protection factor APF may be used to select an amount of coverage provided by a leading edge protector based on the leading edge length LL and the chord length CL of the airfoil while considering weight requirements of a gas turbine engine. The APF is particularly important when considering the location or stage of the airfoil. For example, airfoils experience different stresses upon foreign object impact, such as bird strikes, depending on location. Such foreign objects may impact airfoils of the fan section and cause a portion of the impacted airfoil to be torn loose. The loose airfoil may then impact the interior of the fan casing at a primary impact zone, thereby causing a portion of the casing to bulge or deflect. This deformation of the casing may result in increased stress along the fan casing. Such foreign object damage can also result in cracks or punctures of the fan casing.

It has been determined that providing a multilayer fan casing can lessen the extent of damage during foreign object impacts. This, in combination with the APF and the stage protection factor SPF are useful for determining engine configurations while considering weight requirements. Accordingly, the present disclosure provides for a fan casing with a composite core having a puncture resistant layer and an energy capture layer. The puncture resistant layer and energy capture layer are disposed in a primary impact zone of the fan casing. The puncture resistant layer is characterized by a high through-thickness shear strength and a high interlaminar toughness at impact. The energy capture layer is characterized by a high in-plane tensile strength and low resistance to delamination and fiber-matrix debonding at impact. It is further contemplated that the primary impact zone can additionally or alternatively include a woven glass layer included within a multiple layer fan casing. The inclusion of a woven glass layer can minimize or eliminate back-side fiber failure such that through holes from blade impacts do not occur.

The fan casing with the multiple layer configurations have high impact resistance and lessen the extent of damage. The fan casings described in combination with airfoils with a leading edge protector with the APF and SPF relationships disclosed herein, result in a gas turbine engine having improved durability and system performance. It will be appreciated that the inclusion of the composite fan casing combined with the airfoil design based on the stage protection factor SPF is useful for making trade-offs when determining an amount of protection on a first airfoil in relationship to an amount on an airfoil downstream of the first airfoil.

Figure 7:
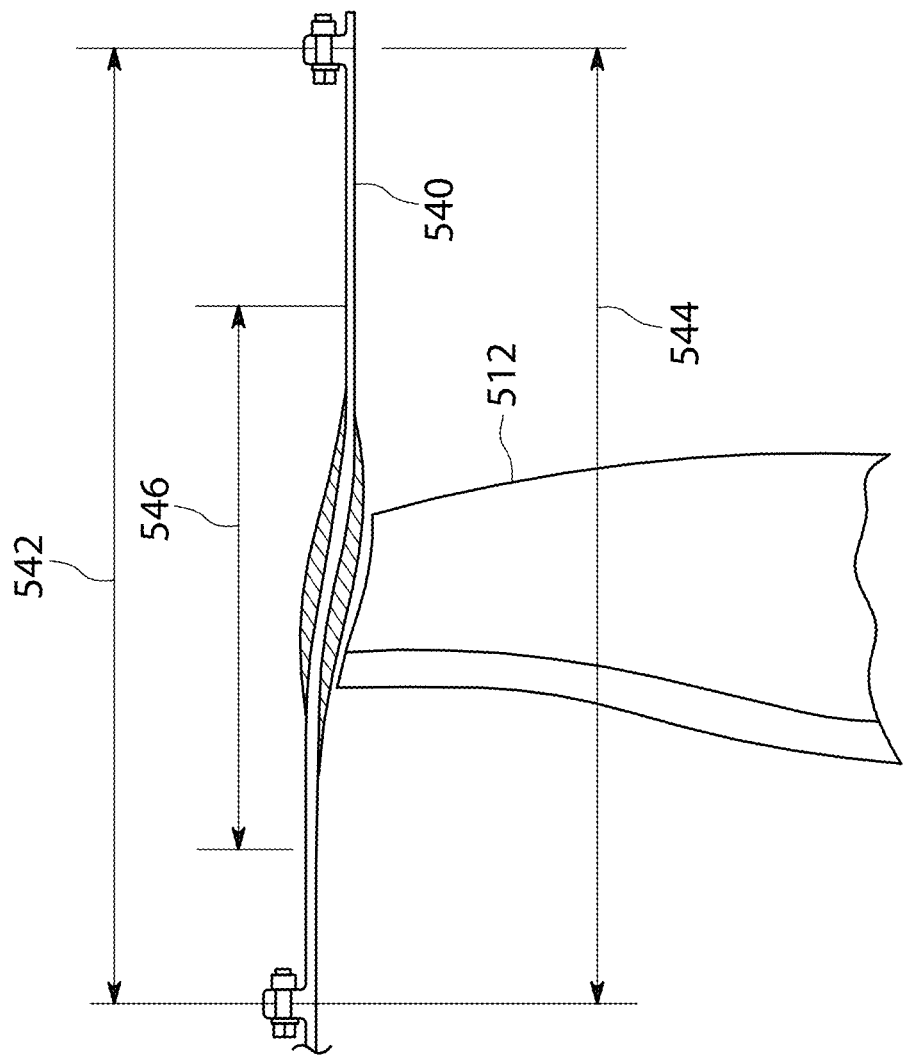
FIG. 7 is an enlarged fragmentary longitudinal schematic cross-sectional view illustrating a portion of a fan casing in accordance with another exemplary embodiment of the present disclosure.

The present disclosure includes a fan casing wherein at least a portion of the fan casing includes multiple layers. It will be understood that a fan casing having multiple layers as described in the remainder of the application can be utilized with any suitable gas turbine engine including any of the previously described gas turbine engines. FIG. 7 is a schematic view illustrating a portion of a fan casing 540 configured to form a hardwall containment system that includes a length 542 that is substantially equal to a fan assembly length 544. The length 542 circumscribes a primary impact region 546 of the fan assembly 512.

Figure 8:
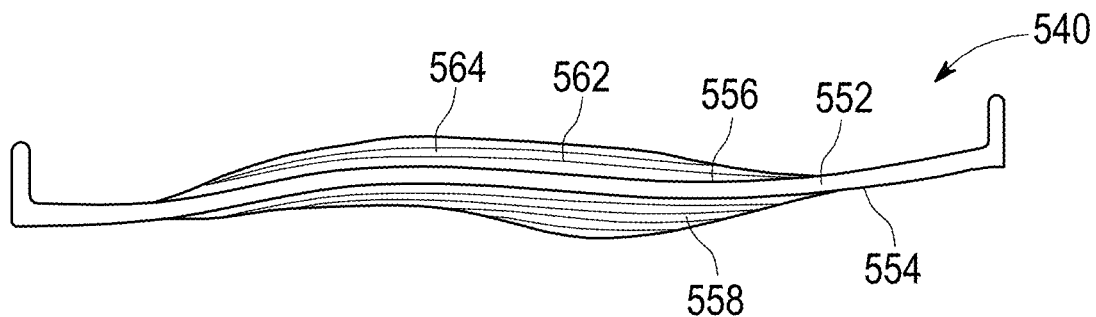
FIG. 8 is a schematic view illustrating a portion of a fan casing that can be utilized with any of the herein described gas turbine engines in accordance with another exemplary embodiment of the present disclosure.
Figure 9:
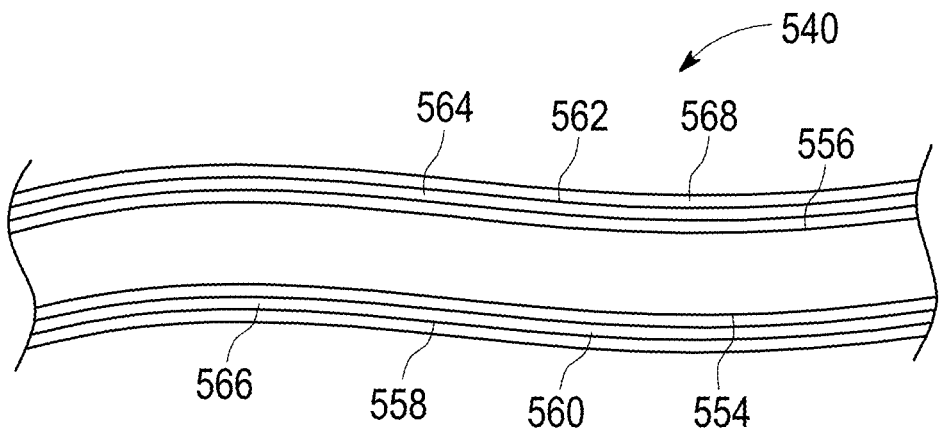
FIG. 9 is an enlarged schematic view of a portion of the fan casing of FIG. 8 according to an exemplary embodiment of the present disclosure.

FIGS. 8 and 9 schematically illustrate that the fan casing 540 includes multiple layers along at least one portion. In one non-limiting example, a puncture resistant layer 558 and an energy capture layer 562 are included with at least a portion of the fan casing. It is contemplated that any number of puncture resistant layer(s) 558 and any number of energy capture layer(s) 562 can be included. In a further non-limiting example, a composite core 552 having an inner surface 554 and an outer surface 556 is included in the fan casing 540 and can form one of the multiple layers. It is contemplated that at least one puncture resistant layer 558 is integrated with the composite core 552 on the inner surface 554. For example, the at least one puncture resistant layer 558 can be bonded to the inner surface 554 of the composite core 552 with a resin 560. The puncture resistant layer(s) 558 is configured to reduce the instance where the fan casing 540 is punctured during fan blade failure. Further still, the at least one energy capture layer 562 can be integrated with the composite core 552 on the outer surface 556. For example, the at least one energy capture layer 562 can be bonded to the outer surface 556 of the composite core 552 with a resin 564. The energy capture layer(s) 562 are configured to limit or eliminate deformation of the fan casing 540 due to high tension resistance and delamination properties.

For the illustrated examples, the puncture resistant layer(s) 558 and the energy capture layer(s) 562 are coextensive with a length of the composite core 552. However, this need not be the case and it will be understood that in other non-limiting examples, one or both of the puncture resistant layer(s) 558 and the energy capture layer(s) 562 may be locally disposed. For example, the puncture resistant layer(s) 558 may be configured proximate a leading edge of a fan blade(s) to provide local, enhanced impact resistance.

The utilization of multiple material layers at a primary impact zone within the fan casing 542 for blade containment provide optimization of impact resistance based on different impact failure mechanisms of the differing material layers and the capabilities of the differing materials. In the specific non-limiting example illustrated with the utilization of the puncture resistant layer(s) 558 and the energy capture layer(s) 562 in combination with the composite core 552 different properties can be imbued to the fan casing 542. By way of non-limiting example, at a sharp object impact region, such as primary impact region 546, the impacted inner layer of the fan casing 540 is subjected to through-thickness shear dominant loading and the exterior layer is subjected to tension dominant loading. A material system with high resistance to both through-thickness shear and delamination at an interior surface of the fan casing 540 and high resistance to tension and prone to delamination at an exterior surface of the fan casing 540 would provide beneficial impact resistance qualities.

Accordingly, the puncture resistant layer(s) 558 can include, by way of non-limiting example, a fiber/resin material with high through-thickness shear strength and high interlaminar toughness at impact. By way of yet further non-limiting examples, the puncture resistant layer(s) 558 may include fibers including, but not limited to, S2 glass, E-glass, quartz, alumina, silica, boron oxide, or carbon fibers and a toughened resin, such as dicyclopentadiene (DCPD) or other resin with high fracture toughness (with or without nano particles and resin tougheners), a ceramic material, textile architecture, or other materials or architectures with high-through thickness shear capability. The fibers 566 may include any of the various fiber architectures available. In the illustrated example, the puncture resistant layer(s) 558 may include S2 glass fibers 566 that may include chopped fibers, continuous monofilament, a tow, a yarn, or roving consisting of a multitude of monofilaments, or continuous fiber tows or yarns that may be made from shorter fibers and woven or braided into a fabric. It will be understood that the selection of the fiber architecture may depend on several factors including but not limited to the directionality of the stress to which the fibers 566 will be subjected to and various other factors. The glass fibers 566 may form a woven fabric, non-woven, a wrap, a blanket, a winding, a knitted fabric, a carded non-woven fabric, or a braided fabric.

Any suitable reinforcing fabric such as a ceramic fabric or a non-ceramic fabric may be used in the composite core 552. Some examples of non-ceramic fabrics include, but are not limited to, carbon fiber, graphite fiber, polyimide fiber, or aromatic polyamide fiber, ultra-high molecular weight polyethylene, and combinations thereof. By way of further non-limiting example, the non-ceramic fabric can include carbon fiber, which provides high mechanical strength and stiffness.

By way of non-limiting example, the energy capture layer(s) 562 may include a fiber/resin material with high in-plane tensile strength and low resistance to delamination and fiber-matrix debonding at impact. The fibers may include any of the various fiber architectures available. More specifically, in a further non-limiting example the energy capture layer(s) 562 may include fibers including but not limited to graphite, carbon, polyimide, aromatic polyamide, or ultra-high molecular weight polyethylene, and a resin, such as dicyclopentadiene (DCPD), or other resin that does not bond well with the fibers to facilitate delamination, tape architecture or other materials or architectures with high in-plane tensile capability. In addition, in an example, a fiber sizing and/or surface treatment may be used to keep the fibers from bonding with the resin. In the illustrated example, the energy capture layer(s) 562 may include carbon fibers 568 that may include chopped fibers, continuous monofilament, a tow, a yarn, or roving consisting of a multitude of monofilaments, or continuous fiber tows or yarns may be made from shorter fibers and woven into a fabric. One skilled in the art would select a specific fiber architecture depending on the end use requirements. More specifically, the selection of the fiber architecture may depend on several factors. These factors include the directionality of the stress to which the fiber will be subjected to and various other factors. The carbon fibers may form a woven fabric, non-woven, a wrap, a blanket, a winding, a knitted fabric, a carded non-woven fabric, or a braided fabric.

Any suitable resin may be used in bonding the multiple layers of the fan casing 542, including, by way of non-limiting example, the bonding of the puncture resistant layer(s) 558 with the composite core 552 and the energy capture layer(s) 562 with the composite core 552. Example resins used in conjunction with the puncture resistant layer(s) 558 includes dicyclopentadiene (DCPD) or other resin with high fracture toughness that is capable of good adhesion with the fibers utilized in the puncture resistant layer(s) 558, such as, but not limited to, epoxies, bismaleimides, and polyimides. In an alternative example, the puncture resistant layer(s) 558 may include resin tougheners. Example resins used in conjunction with the energy capture layer(s) 562 includes dicyclopentadiene (DCPD), a brittle resin, or other resin that includes poor adhesion properties to the fibers utilized in the energy capture layer(s) 562, such as, but not limited to epoxies, bismaleimides, polyimides, polyesters, and vinylesters.

The thickness, composition, and position of the various layers of the fan casing 542 may be designed based on the required physical properties, the APF and SPF relationships disclosed above, and end use application. FIG. 9 schematically illustrates a non-limiting example where puncture resistant layer(s) 558 are disposed on the inner surface 554 of the composite core 552 and energy capture layer(s) 562 are disposed on the outer surface 556 of the composite core 552. While multiple layers are illustrated it will be understood that a single layer can be utilized. In the above examples, the thicknesses of the various layers can be determined empirically, and vary widely depending on the materials used, and the design criteria. Typically, the puncture resistant layer(s) 558 extend over the primary impact region 546 (FIG. 7) of the inner surface 554 of the composite core 552 and extend along a length of the composite core 552. Further still, typically the energy capture layer(s) 562 extend over the primary impact region 546 (FIG. 7) of the outer surface 556 of the composite core 552 and extend along a length of the composite core 552. It will be understood that the use of multiple layers for the fan casing 542 including but not limited to the puncture resistant layer(s) 558, the composite core 552, and the energy capture layer(s) 562 could reduce weight and cost, while providing blade containment.

By integrating the puncture resistant layer(s) 558 and the energy capture layer(s) 562, the containment case 550 receives the benefit of the shear strength and tensile strength of the puncture resistant layer(s) 558 and the energy capture layer(s) 562 at the impact zones, so that hard objects are deflected from the case at impact without puncturing the fan casing 542. Because the puncture resistant layer(s) 558 are integrated with the composite core 552 they suffer no fragmentation at impact.

Figure 10:
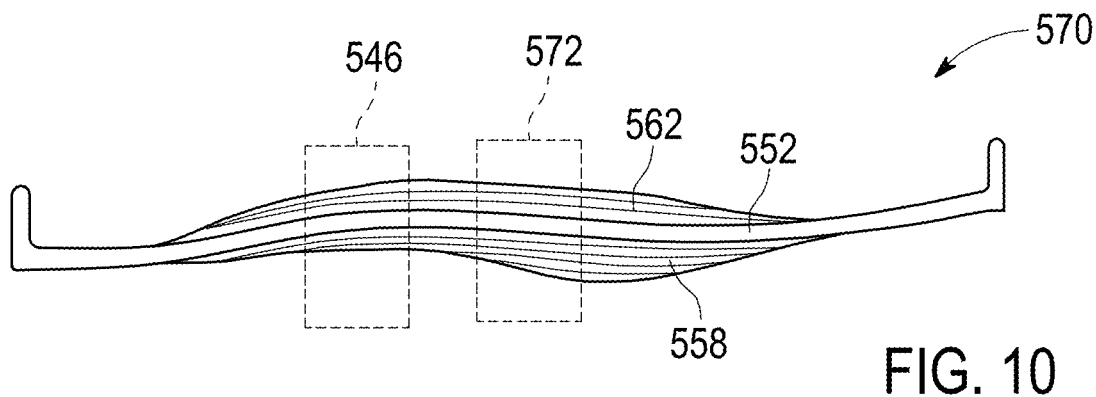
FIG. 10 is an enlarged schematic view of a portion of the fan casing in accordance with another exemplary embodiment of the present disclosure.

In a non-limiting example, the puncture resistant layer(s) 558 and the energy capture layer(s) 562 may facilitate the fabrication of a constant thickness composite core 552. FIG. 10 schematically illustrates an example of a fan casing 570 wherein the composite core 552 is characterized by a substantially uniform thickness over an axial length of the composite core 552 including a primary impact region 546 and a root impact region 572. Similar to the previous example, fan casing 570 includes the benefit of the shear strength and tensile strength of the puncture resistant layer(s) 558 and the energy capture layer(s) 562.

Figure 11:
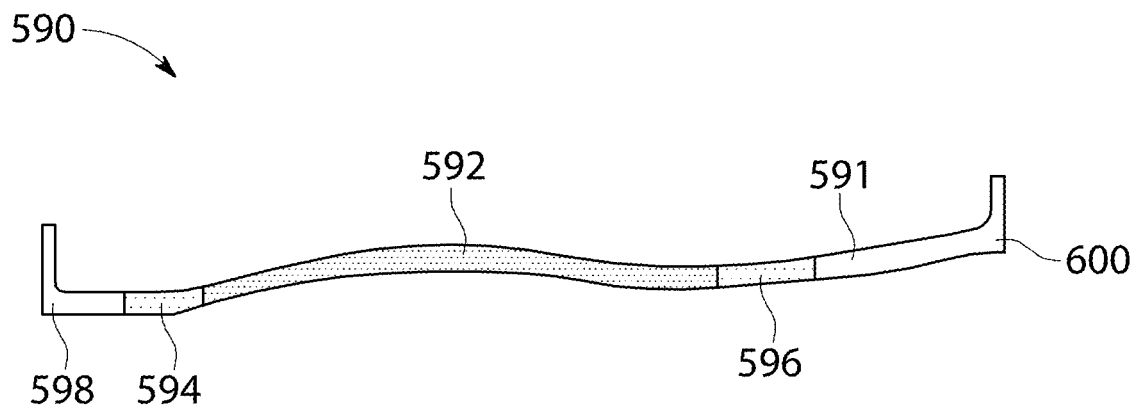
FIG. 11 is an enlarged schematic view of the fan casing of FIG. 8 according to an exemplary embodiment of the present disclosure.
Figure 12:
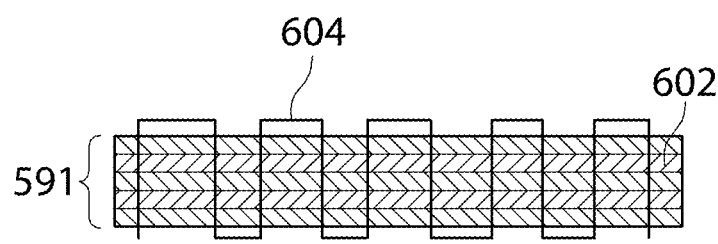
FIG. 12 is a schematic view illustrating a portion of the fan casing of FIG. 11 according to an exemplary embodiment of the present disclosure.
Figure 13:
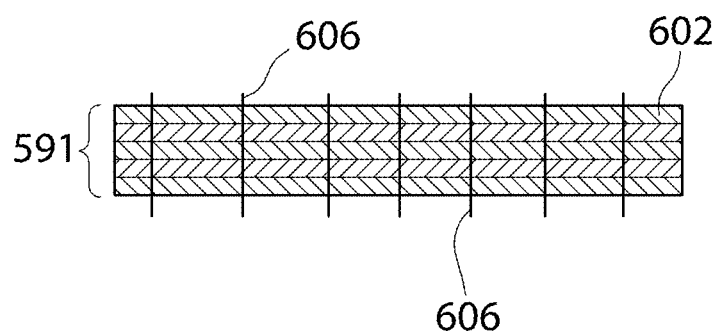
FIG. 13 is a schematic view illustrating a portion of the fan casing of FIG. 11 according to an exemplary embodiment of the present disclosure.

Referring now to FIGS. 11-13, in an example, a composite core 591, generally similar to the composite core 552 of FIGS. 8-10, may further include reinforcement stitching to control delamination upon impact by keeping any present delamination from spreading outside a primary impact region 592. Referring more specifically to FIG. 11, illustrated is the composite core 552 of fan casing 590. For clarity, the puncture resistant layer(s) 558 and the energy capture layer(s) 562 are not shown. The fan casing 590 includes a forward stitching zone 594 and an aft stitching zone 596 both of which prevent delamination caused by an impact from spreading outside of the primary impact zone 592, and toward a forward end flange 598 and an aft end flange 600, which are the primary structural attachments.

FIG. 12 shows a portion of the composite core 591, which may include a plurality of composite material layers 602 and through-thickness stitching 604 in a non-limiting example. The through-thickness stitching 604 being located in the forward stitching zone 594, the aft stitching zone 596, or a combination thereof. In an alternative example, as shown in FIG. 13, through-thickness pinning 606 may be provided in the composite core 591 including in the forward stitching zone 594, the aft stitching zone 596, or a combination thereof. Further still, the through-thickness pinning 606 can be combined with the through-thickness stitching 604 (of FIG. 12) in one of the forward stitching zone 596, the aft stitching zone 598, or a combination thereof.

Figure 14:
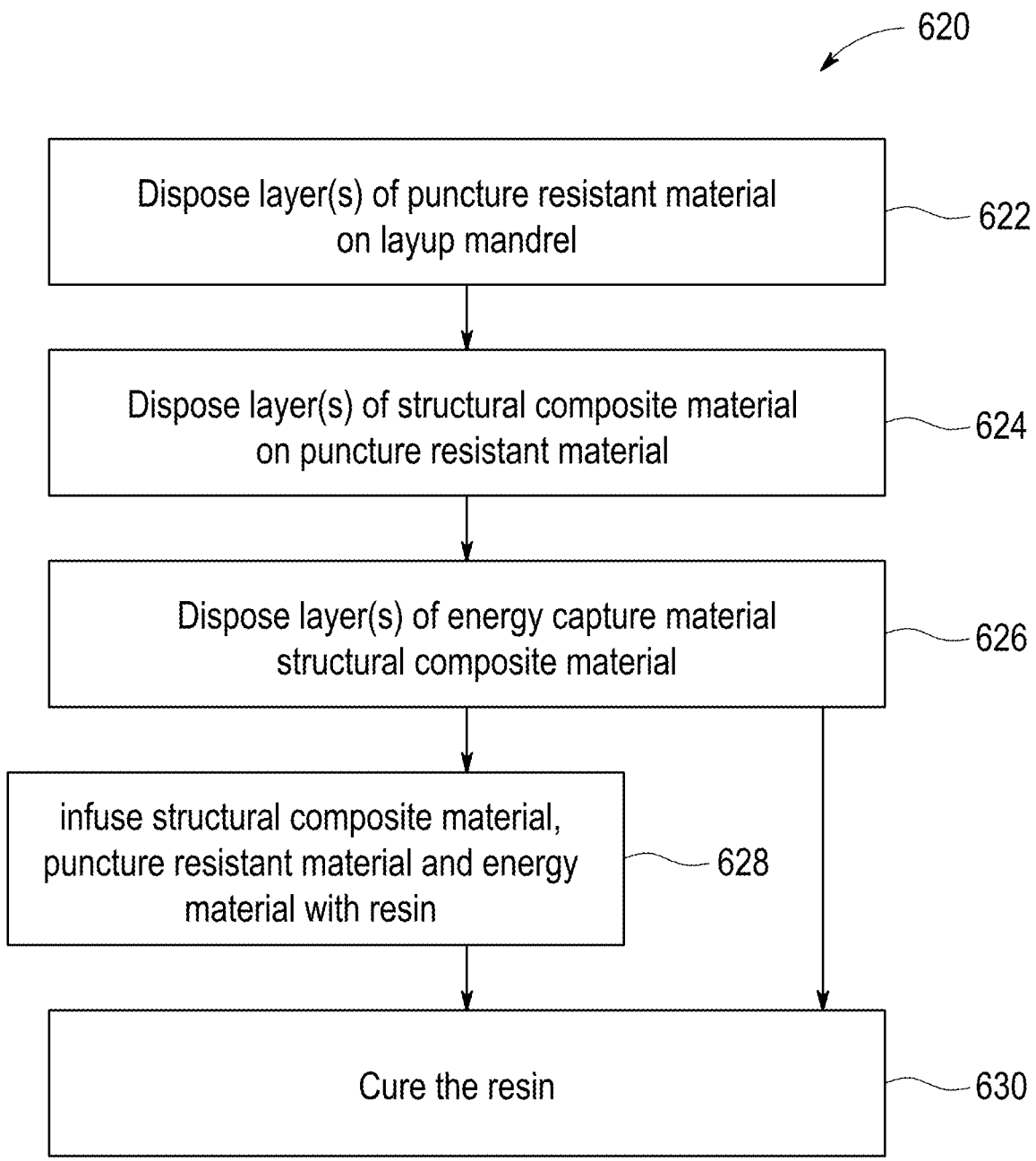
FIG. 14 is a flow chart diagram of a method of fabricating a fan casing according to an exemplary embodiment of the present disclosure.

A method for fabricating a fan casing is described with reference to FIG. 14 in a non-limiting example. Containment cases of any desired shape may be formed by any suitable forming technique, such as resin transfer molding (RTM), vacuum assisted resin transfer molding (VARTM), resin film infusion, thermoforming, as well as vacuum forming, such as vacuum infusion or pressure injection, and other techniques. Method 620 includes disposing one or more layers of a puncture resistant material on a layup mandrel at 622. This can include, by way of non-limiting example, a winding or fiber placement process. At 624, one more layers of a structural composite material can be disposed on an exterior surface of the puncture resistant material. Again, in a non-limiting example this can include a winding or fiber placement process. At 626, one or more layers of an energy capture material can be disposed on an exterior surface of the structural material. Again, in a non-limiting example this can include a winding or fiber placement process. At 628, optionally where unimpregnated material layers are utilized, resin can be infused. In an alternate method, pre-impregnated tapes, having resin applied to the fibers before the material is deposited, may be deposited in at 622, 624, and 626, thereby eliminating the need for resin infusion at 628. The resin is cured in at 630.

It will be understood that any suitable method can be utilized. By way of further non-limiting example, pre-impregnated tapes (resin applied to fibers before the material is deposited) are utilized as input material. Initially, one or more layers of the puncture resistant material are disposed on a layup mandrel. These layers would only be located in the middle region of the fan casing and thus would not extend over the full extent of the tool. In order to achieve high puncture resistance, a special winding pattern may be utilized to provide a large number of fiber interlocks. Next, one or more layers of a structural composite material are disposed on an upper surface of the puncture resistant material. It is contemplated that at least some of the structural composite material layers would extend to the forward and aft edges of the containment case. The structural composite material layers may utilize a conventional winding approach wherein no interlocking of the fibers is included, thus providing higher strength for operational and vibratory loads. Subsequent to the disposing of the structural composite material layers, one or more layers of an energy capture material are disposed on an upper surface of the composite structural material. The energy capture material layer(s) would typically be located only in the middle region of the fan casing although this need not be the case. In an example, the energy capture material layer(s) may not be aligned with the puncture resistant material layer(s). In an example, the energy capture material layer(s) may be configured to include a highly interlocked arrangement. A curing process, typically under heat and pressure, may be provided to cure the pre-impregnated material layers.

By way of further non-limiting example, unimpregnated materials, and more particularly dry woven materials, braided materials, or individual fiber tows that have been tackified can be utilized as input material. Initially, one or more layers of the puncture resistant material (e.g. braid or weave) are disposed on a layup mandrel using a wrapping, winding or fiber placement process. By way of non-limiting example, such layers would only be located in the middle region of the fan casing, and thus would not extend over the full extent of the tool. To achieve high puncture resistance, a special winding pattern may be utilized to provide a large number of fiber interlocks. One more layers of a structural composite material are disposed on an upper surface of the puncture resistant material using a wrapping, winding or fiber placement process. At least some of the structural composite material layers would extend to the forward and aft edges of the containment case. The structural composite material layers may include a weave pattern with very little fiber undulation or be disposed using a winding or fiber placement process to place dry fiber tows. In an example, the fiber tows may have to be slightly tackified with resin to provide adequate adhesion, but would not be fully impregnated with a resin. Different types of tackifiers and methods of application are well known to those skilled in the art and are not repeated here. Subsequent to the disposing of the structural composite material layers, one or more layers of an energy capture material (e.g. braid or weave) are disposed on an upper surface of the composite structural material using a wrapping, winding or fiber placement process. The energy capture material layer(s) would typically be located only in the middle region of the fan casing and may not be aligned with the puncture resistant material layer(s) although this need not be the case. The structure composite material layers(s), the puncture resistant material layer(s) and the energy capture material layer(s) are infused with resin (e.g. epoxy, DCPD). A curing process, typically under heat and pressure, may subsequently be provided to cure the now impregnated material layers.

The number and position of the various material layers depend on the desired configuration of the composite case. In an alternate example, these material layers may be provided in a mold. The shape, size, and configuration of the mold may depend, in part, on the shape and size of the composite case to be manufactured. Molds and associated parts are known in the art and are not described in detail herein.

With respect to the infusion of resin at 628, the infusion may be controlled by a pressure gradient, for a resin transfer process. The number and position of the sources of pressure gradient and resin injection partly depends on the specific system design and the resin article configuration. Each resin and vacuum source may be controlled individually using a valve or other means of stopping the flow of material. The flow of resin may be stopped when sufficient resin has entered the layers. The flow may be controlled by properly adjusting the resin gel time, measuring the amount of resin that has entered the layers and stopping the flow of resin when a pre-metered amount of resin has infused the layers, or using a sensor to control the flow of resin.

With respect to the curing at 630, the resins may be catalyzed for high temperature cure or room temperature cure and for various cures times as is compatible with the needs of the process. The resins may be properly catalyzed and degassed prior to injection into the fiber preform. The wide variety of useful resins and the methods of preparing the resins are all widely known in the art. One skilled in the art would know how to choose a suitable resin and process it depending on the end use application.

In yet another non-limiting example of a method, the resin in the energy-capture material layer(s) may be formed having an unusually high level of porosity in order to facilitate debonding between the fiber and the resin that include the material layer(s) and promote delamination between the material layer(s). In typical structural composites, efforts are made to keep the porosity level below about 2% of the total composite volume. In an example where the resin in the energy-capture layer(s) is formed having an unusually high level of porosity, the porosity level may be greater than 5% including that it may be more than 20%.

Figure 15:
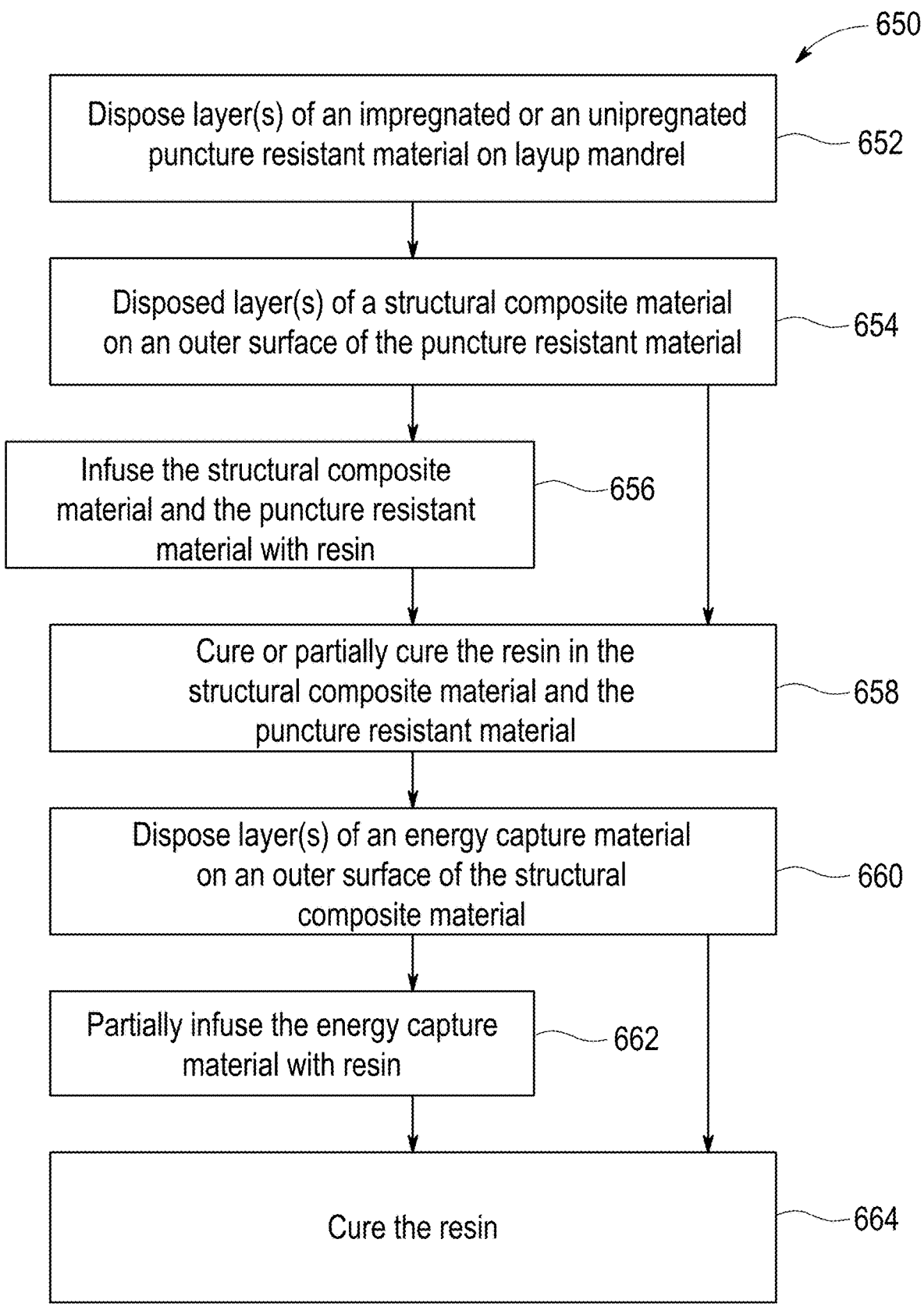
FIG. 15 is a flow chart diagram of a method of fabricating a fan casing according to an exemplary embodiment of the present disclosure.

Accordingly a method for fabricating a fan casing wherein a resin in the energy-capture layer(s) may be formed having an unusually high level of porosity is described with reference to FIG. 15. Similar to the previously defined method(s), the containment cases may be of any desired shape and formed by any suitable forming technique, such as resin transfer molding (RTM), vacuum assisted resin transfer molding (VARTM), resin film infusion, thermoforming, as well as vacuum forming, such as vacuum infusion or pressure injection, and other techniques. As indicated for example in FIG. 15, the method 650 includes disposing one or more layers of a puncture resistant material on a layup mandrel, at 652. At 654, one more layers of a structural composite material can be disposed on an exterior surface of the puncture resistant material. At 656, and in contrast to the previously described method(s), where unimpregnated material layers are utilized, the composite material and the puncture resistant material are infused with resin, prior to the deposition of the energy capture material. In an alternate method, pre-impregnated tapes, having resin applied to the fibers before the material is deposited, may be utilized. The composite material and the puncture resistant material are cured, either partially or fully, at 658. The full or partial curing of the resin in the composite material and puncture resistant material will increase the viscosity of the resin and inhibit flow of resin into the energy capture layer under subsequent processing.

At 660, one or more layers of an energy capture material can be disposed on an exterior surface of the structural material using a winding or fiber placement process. Either pre-impregnated or "dry" materials can be used as noted previously. If "dry" materials are used, the fibers can be tackified with a small amount of resin to allow them to adhere to the composite material. If a high level of porosity in the energy capture material layer(s) is desired, no further resin infusion may be necessary. If additional resin is desired, it can be added to the energy capture material in a separate infusion step using processing conditions that will promote high porosity such as low infusion pressure. More specifically, at step 662, where unimpregnated material layers are utilized, the energy capture material layer(s) may be infused with resin. Finally, the full assembly is subjected to a cure cycle at step 664 to cure the resin in the energy capture material layer(s) and, if necessary, finish curing the resin in the composite core material layer(s) and puncture resistant material layer(s). Low cure pressures may be desired in this cycle to facilitate high porosity in the energy capture layer.

Figure 16:
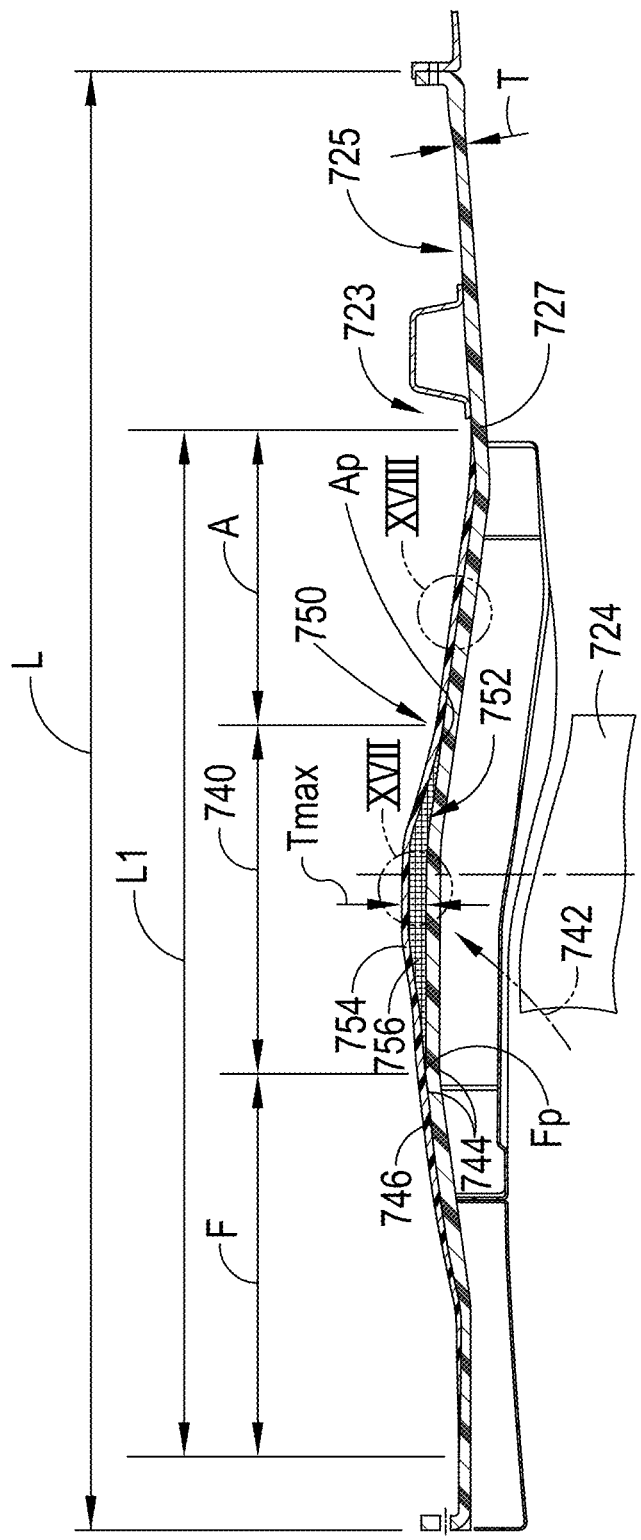
FIG. 16 is an enlarged view of a portion of a fan casing that can be utilized with any of the herein described gas turbine engines in accordance with another exemplary embodiment of the present disclosure.

FIG. 16 is a schematic view of a fan casing 723 that also includes multiple layers. The fan casing 723 at least in part define the axial length (L), a sub-portion of which defines a blade impact zone or primary impact zone 740. The primary impact zone 740 can be larger or smaller than illustrated and is defined as an axially extending region most likely to receive an impact from fan blade 724 in the event of a fan blade out. By way of non-limiting example, a blade trajectory path 742, a path along which a portion of the fan blade 724 would most likely travel in the event of a fan blade out is shown.

By way of non-limiting example, an inner composite fiber layer 727 of the fan casing 723 can be co-extensive with the fan casing such that it extends axially through the full length (L). The inner composite fiber layer 727 can extend radially between an inner surface 744 and an outer surface 746. The inner composite fiber layer 727 may maintain a constant thickness (T) throughout although this need not be that case. A non-limiting example for the inner composite layer 727 is use of a woven fiber. When the inner composite fiber layer 727 is made out of a woven fiber, there can be a constant number of weave layers across the whole length (L). By way of further non-limiting example, all weave layers can extend across the entire length (L), and the weave can be oriented such that the warp weave, fibers held stationary in tension, direction is in the circumferential direction of the case and the weft weave, fibers drawn through and inserted over and under the warp weave, direction is in the axial direction of the case. In such a case, thickness changes in the composite fiber layer 727 can be achieved by adding or subtracting warp fibers. The thickness (T) affects the capability, or strength and stiffness, of the inner composite fiber layer 727. An inner composite fiber layer 727 having a greater thickness (T) decreases the axial capability of the annular shell 725 and increases the hoop capability while a lesser thickness (T) increases the axial capability but decreases the hoop capability. A thickness (T) with a warp to weft fiber ratio of between 1:2 and 2:1 optimizes both the axial and hoop capabilities.

Multiple layers 752 form the fan casing 723. The inner composite fiber layer 727 is wrapped in additional layers to form an annular casing wrap 750 circumscribing the annular shell 725 along at least a portion of the outer surface 746 of the annular shell 725 inner composite fiber layer 727. The annular casing wrap 750 includes an outer composite fiber layer 754 overlying the inner composite fiber layer 727 with a woven glass layer 756 sandwiched therebetween. Each of the additional layers formed by the outer composite fiber layer 754 and the woven glass layer 756 can be wrapped about the annular shell 725 to form areas of varying thickness in the radial direction with an area of maximum thickness (TMAX) located within the primary impact zone 740 where the blade trajectory path 742 intersects the inner surface 744 of the inner composite fiber layer 727.

The outer composite fiber layer 754 abuts the inner composite fiber layer 727 beyond the primary impact zone 740. The outer composite fiber layer 754 can extend axially forward of the primary impact zone 740 to define a forward portion (F) of the annular casing wrap 750. The forward portion (F) extends forward from a contact point (Fp) where the woven glass layer 756 terminates and the composite fiber layer 754 abuts the inner composite fiber layer 727. It is further contemplated that the outer composite fiber layer 754 can extend axially aft from the primary impact zone 740 to define an aft portion (A) of the annular casing wrap 750. The aft portion (A) extends aft from a contact point (Ap) where the woven glass layer 756 terminates and the composite fiber layer 754 abuts the inner composite fiber layer 727. In a non-limiting example, the forward portion (F) and the aft portion (A) of the fan casing 723 can include only the inner composite fiber layer 727 and the outer composite fiber layer 754. The outer composite fiber layer 754 can co-extend with the fan casing 723 such that it is equal to the axial length (L) but greater than the axial extent of the primary impact zone 740. It is further contemplated that the outer composite fiber layer 754 is less than the axial length (L). By way of non-limiting example, the outer composite fiber layer 754 can include multiple wraps of layers of carbon fiber material.

Figure 17:
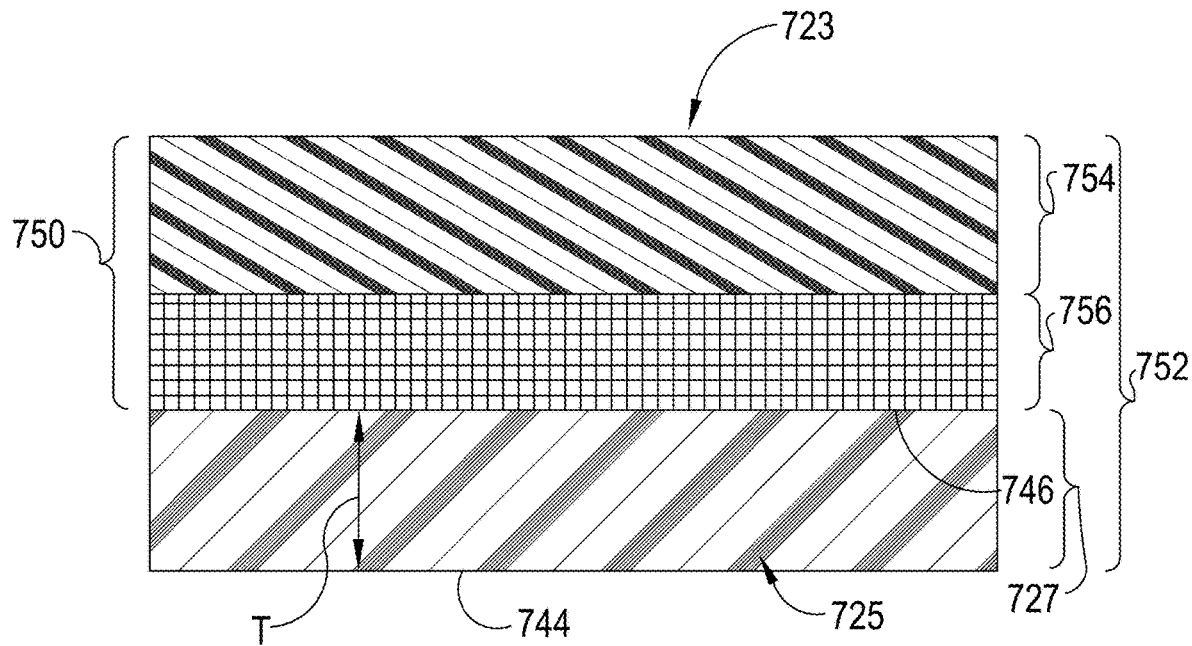
FIG. 17 is a cross-sectional view of a portion of the fan casing taken along line XVII of FIG. 16 according to an exemplary embodiment of the present disclosure.

FIG. 17 illustrates a schematic of an enlarged view of the primary impact zone 740 to more clearly distinguish the multiple layers 752 that form the fan casing 723. The woven glass layer 756 can be any type of woven glass fiber. By way of non-limiting example an S2 class fiberglass can be utilized. It is contemplated that any fiber having a higher puncture resistance than the fibers used in the inner composite fiber layer 727 or the outer composite fiber layer 754, for example R-glass, can be used. A list of such fibers can be found in the ASM Handbook, Vol. 21 Composites. The outer composite fiber layer 754 can be, by way of non-limiting example, an intermediate modulus, IM, type 7 graphite. The outer composite fiber layer 754 can be any carbon fiber suitable for a casing and is not meant to be limited. Both the woven glass layer 756 and the outer composite fiber layer 754 can be formed with varying thickness within the primary impact zone 740 such that the thickness is increased toward the maximum thickness (TMAX) while tailoring the hoop and axial capabilities of the fan casing 723.

In a non-limiting example, the inner composite fiber layer 727 can be formed by wrapping a woven fiber preform material around the circumference of the case with the woven layer extending across the entire axial length of the case. The layer can be infused with resin and cured using a resin transfer mold (RTM) process to achieve a composite material of a constant thickness (T). By way of further non-limiting example, the inner composite fiber layer 727 can be made from carbon fiber that has been woven to form a network of fibers with most fibers in the plane of the weave, but having some fibers extending through the thickness to interlock the fiber layers of the weave. The through-thickness fibers could either extend fully through the thickness to achieve a 3D weave or partially through the thickness to achieve a 2.5 D weave. It is also contemplated that the inner composite fiber layer 727 is any textile composite material having a woven, braided, non-crimp fabric for example, but not limited to graphite fiber, glass fiber, ceramic fiber, or aramid polymer fiber.

Figure 18:
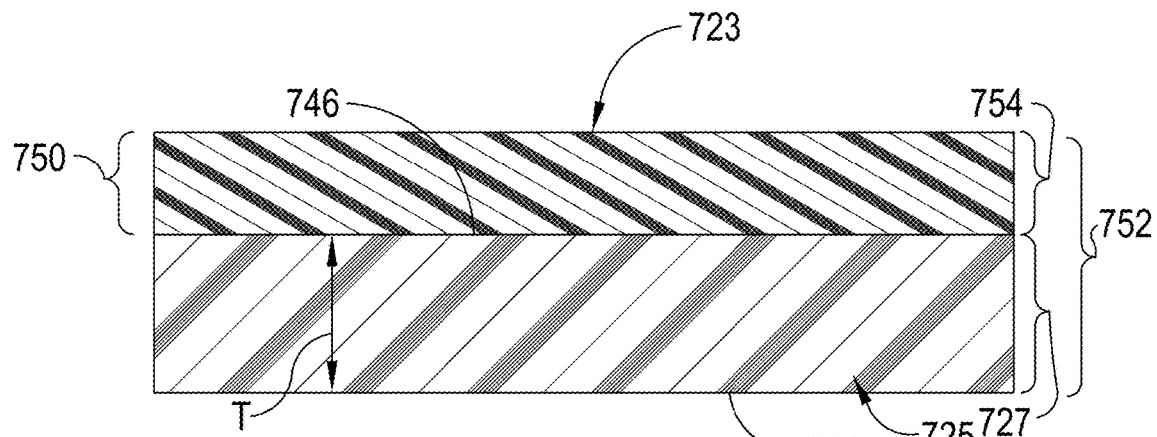
FIG. 18 is a cross-sectional view of portion of the fan casing taken along line XVIII of FIG. 16 according to an exemplary embodiment of the present disclosure.

FIG. 18 illustrates an enlarged view of the aft portion (A) to more clearly distinguish the outer composite fiber layer 754 annular shell 725. It should be understood that this enlarged view can also represent the forward portion (F). The inner composite fiber layer 727 has the same thickness (T) as illustrated in FIG. 17 while the annular casing wrap 750 only includes the outer composite fiber layer 754 within the forward portion (F) and aft portion (A).

Figure 19:
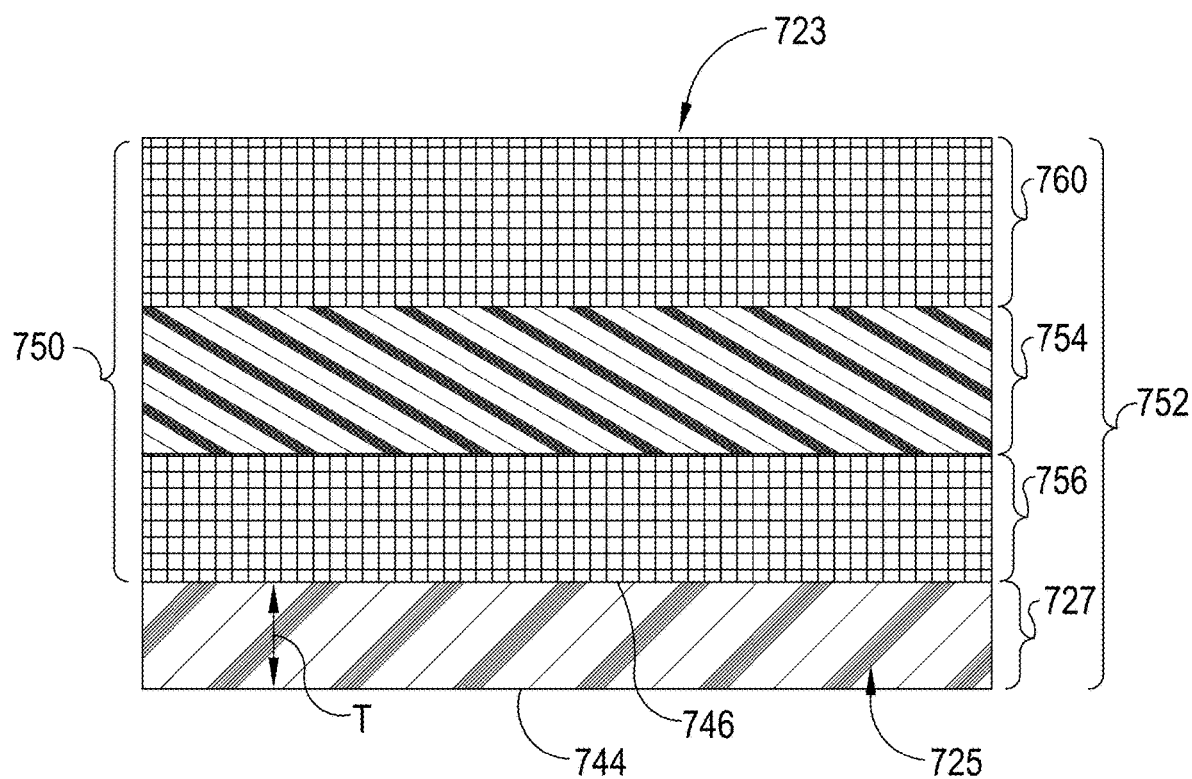
FIG. 19 is a variation of the cross-sectional view of FIG. 17 according to another exemplary embodiment of the present disclosure.

As shown in FIG. 19, it is further contemplated that another layer 760, which can be by way of non-limiting example a woven layer, overlies the outer composite fiber layer 754 to form three distinct layers of materials within the annular casing wrap 750. The other layer 760 can be formed from the same material as the woven glass layer 756, by way of non-limiting example S2 Fiberglass, although this need not be the case. For example, it is also contemplated that the other layer 760 is a different material than the woven glass layer 756. By way of non-limiting example, this could include a material with higher elongation capability than carbon such as S-glass, E-glass, Kevlar, or Dyneema. It is further contemplated that the other layer 760 extends along the entire axial length (L1) of the annular ramp such that it is the same length as outer composite fiber layer 754. It is also contemplated that other layer 760 extends into one of the forward portion (F) or aft portion (A) such that the annular casing wrap 750 includes two layers within the forward portion (F) or aft portion (A), where the two layers are the other layer 760 and the inner composite fiber layer 754.

Figure 20:
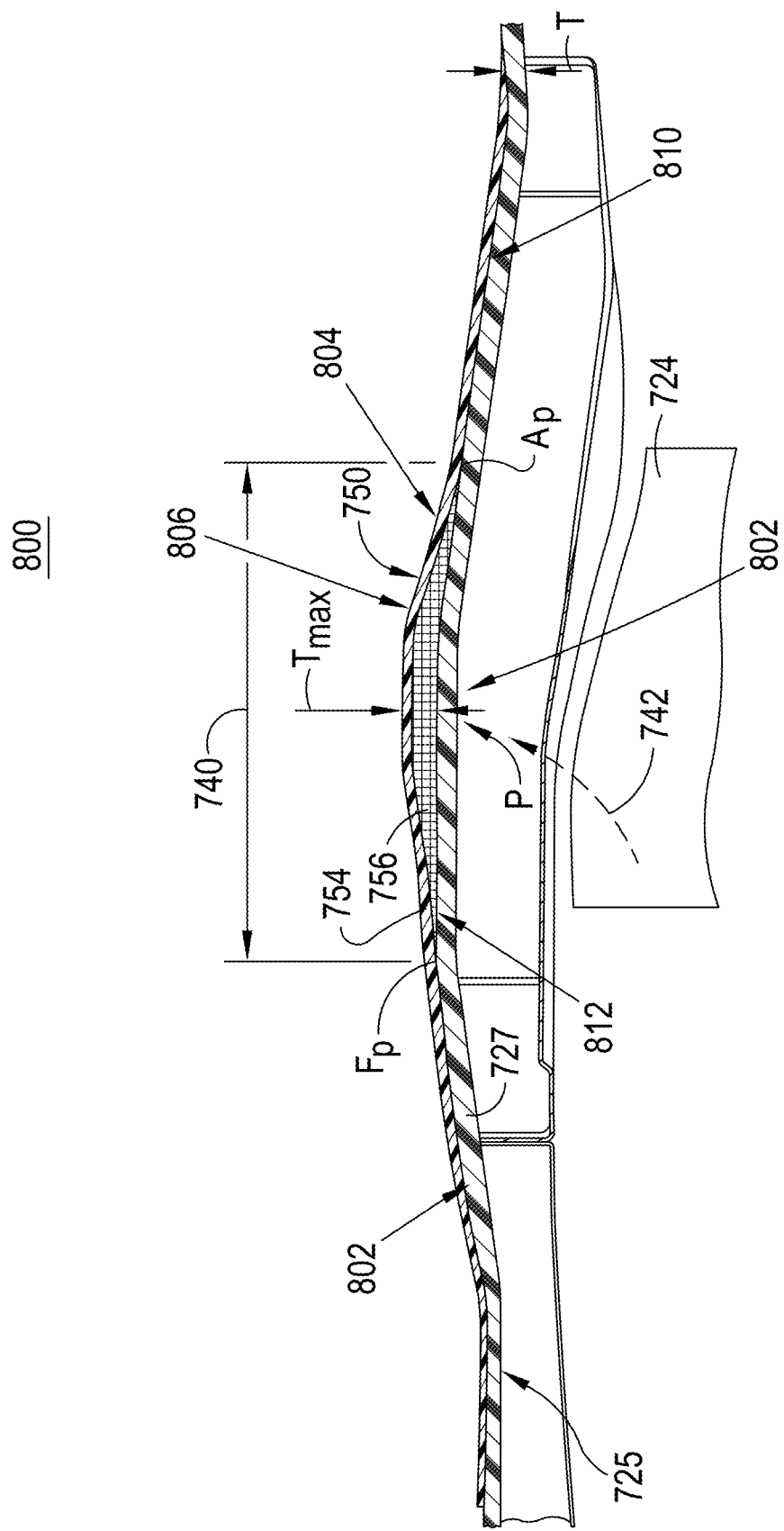
FIG. 20 is an enlarged view of the fan casing of FIG. 16 according to an exemplary embodiment of the present disclosure.

A method 800 of fabricating the fan casing 723 is described below with reference to FIG. 20. The method 800 includes, at 802, fabricating the annular shell 725 out of an inner composite fiber layer 727 with a constant thickness (T). At 804, the annular shell 725 is wrapped with the additional layers to form the annular casing wrap 750 including at least one carbon layer, by way of non-limiting example the outer composite fiber layer 754 and at least one woven glass layer, by way of non-limiting example, the woven glass layer 756. It should be understood that forming the multiple layers 752 can include forming another layer 760, where the other layer 760 overlays the outer composite fiber layer 754. At 806, the at least one woven glass layer 756 is confined to just the primary impact zone 740. The method further includes at 808 producing a maximum thickness (TMAX) of annular casing wrap 750 at a point (P) along the annular shell 725 within the primary impact zone 740. The point (P) is defined as the point where the blade trajectory path 742 intersects the fan casing 723.

The method 800 can further include, at 810, abutting the at least one carbon layer with the annular shell 725. By way of non-limiting example, this can include abutting the inner composite fiber layer 727 with the outer composite fiber layer 754 outside the primary impact zone 740. Finally, the method can also include, at 812, tapering at least one of the carbon layer 754 or glass layer 756 from the point (P) to where the outer composite fiber layer 754 abuts the inner composite fiber layer 727. By way of non-limiting example, as illustrated, the woven glass layer 756 of glass is tapered in both the forward and aft direction such that the annular casing wrap 750 forms a substantially trapezoidal shape within the primary impact zone 740.

When compared to a layered casing without additional woven glass layer(s), the annular casing wrap 750 can minimize or eliminate back-side fiber failure. In other words, through holes from blade impacts do not occur in the middle portion of the annular casing wrap 750. During testing, impacts to areas with and without the additional layers are compared to form a baseline damage amount on the inner surface 744. This baseline damage amount is the amount of damage sustained in both areas until the damage beings to increase in one of the areas when compared to each other. Even with kinetic energy increases up to 20% above the baseline damage amount, zero through holes were formed in the primary impact zone 740 of the annular casing wrap 750. Tailoring the annular casing wrap 750 to cover these areas minimizes weight for the fan casing 723 and maximizes performance of the fan casing 723 during a fan blade out.

The above described fan casings have improved impact resistance and damage tolerance properties and provide significant weight savings compared to conventional cases. The fan casings as disclosed facilitate containing a released blade or blade part within the containment case in the event a blade is released from the engine during operation and effectively protect other parts of the engine.

Additional benefits associated with the fan casing as described herein include that the plurality of layers within the annular casing wrap facilitates the ability to tailor the thickness to locations where more thickness is needed. The wrapping aspect also enables rapid modification in terms of the placement of the layers. Wrapping the annular shell minimizes any excess weight and localizes necessary thickness in the annular casing wrap.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL)) ((SLL/SCL)) to define a stage protection factor (SPF), and wherein the SPF is greater than or equal to 0.7 and less than or equal to 4 (0.7≤SPF≤4).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the first stage of composite airfoils are fan blades.

The turbine engine of any proceeding clause, wherein the second stage of composite airfoils are outlet guide vanes.

The turbine engine of any proceeding clause, wherein the first airfoil extends spanwise between a first root and a first tip to define a first span length and wherein the second airfoil extends spanwise between a second root and a second tip to define a second span length.

The turbine engine of any proceeding clause, wherein the SPF is determined between 20% and 80% of the first span length and the second span length, inclusive of endpoints.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 (0.95≤SPF≤2.5).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL)) ((CL)) to define an airfoil protection factor (APF); and wherein the APF is greater than or equal to 0.1 and less than or equal to 0.3 (0.1≤APF≤0.3).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the first stage of composite airfoils has a first airfoil protection factor (APF1) and the second stage of composite airfoils has a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7≤SPF≤4).

The turbine engine of any proceeding clause, wherein the SPF is greater than or equal to 0.95 and less than or equal to 2.5 (0.95≤SPF≤2.5).

The turbine engine of any proceeding clause, wherein the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

An indirect drive turbine engine, comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL)) ((SLL/SCL)) to define a stage protection factor (SPF), and wherein the SPF is greater than or equal to 0.7 and less than or equal to 4 ($0.7 \leq SPF \leq 4$).

The indirect drive turbine engine of any proceeding clause, wherein the speed reduction device is a power gearbox.

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a
bypass ratio is between 25:1 and 125:1.

The indirect drive turbine engine of any proceeding clause, wherein the first stage of composite airfoils and the second stage of composite airfoils include a polymer matrix composite (PMC).

The indirect drive turbine engine of any proceeding clause, wherein at least one of the first leading edge protector or the second leading edge protector is a metallic leading edge protector.

The indirect drive turbine engine of any proceeding clause, wherein the first stage of composite airfoils include the plurality of fan blades.

The indirect drive turbine engine of any proceeding clause, wherein the second stage of composite airfoils are outlet guide vanes or fan guide vanes.

The indirect drive turbine engine of any proceeding clause, wherein the first airfoil extends spanwise between a first root and a first tip to define a first span length and wherein the second airfoil extends spanwise between a second root and a second tip to define a second span length.

The indirect drive turbine engine of any proceeding clause, wherein the SPF is determined between 20% and 80% of the first span length and the second span length, inclusive of endpoints.

The indirect drive turbine engine of any proceeding clause, wherein the first stage of composite airfoils has a first number of airfoils and the second stage of composite airfoils has a second number of airfoils and the first number is different than the second number.

The indirect drive turbine engine of any proceeding clause, wherein the first stage of composite airfoils and the second stage of composite airfoils are configured to rotate.

The indirect drive turbine engine of any proceeding clause, wherein the SPF is greater than or equal to 0.95 and less than or equal to 2.5 ($0.95 \leq SPF \leq 2.5$).

The indirect drive turbine engine of any proceeding clause, wherein the first sheath and the second sheath each have a first wall, a second wall, and a third wall interconnecting the first wall and the second wall.

The indirect drive turbine engine of any proceeding clause, wherein the first wall, second wall, and third wall of the leading edge protector are oriented and shaped such that they define a U-shaped or C-shaped channel therebetween.

The indirect drive turbine engine of any proceeding clause, wherein the channel is sized and shaped to receive the composite leading edge of the composite portion.

The indirect drive turbine engine of any proceeding clause, wherein any of the first leading edge protector or the second leading edge protector are coupled to their corresponding composite portion at the corresponding composite leading edge to define at least one seam.

The indirect drive turbine engine of any proceeding clause wherein the at least one seam is two seams on either side of the airfoil, and the corresponding first leading length or second leading length is measured from the corresponding leading edge to the seam furthest from the leading edge.

The indirect drive turbine engine of any proceeding clause wherein the first leading length and the second leading length are measured from their corresponding leading edge to their corresponding seam.

The indirect drive turbine engine of any proceeding clause wherein an amount of overlap between the first sheath or the second sheath and their corresponding.

An indirect drive turbine engine comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL);

and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL)) ((CL)) to define an airfoil protection factor (APF); and wherein the APF is greater than or equal to 0.1 and less than or equal to 0.3 (0.1≤APF≤0.3).

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a bypass ratio is between 25:1 and 125:1.

The indirect drive turbine engine of any proceeding clause, wherein the set of composite airfoils includes a first stage of composite airfoils and a second stage of composite airfoils downstream from the first stage of composite airfoils.

The indirect drive turbine engine of any proceeding clause, wherein the first stage of composite airfoils is the plurality of fan blades and the second stage of composite airfoils is a set of outlet guide vanes or a set of fan guide vanes.

The indirect drive turbine engine of any proceeding clause, wherein the first stage of composite airfoils has a first airfoil protection factor (APF1) and the second stage of composite airfoils has a second airfoil protection factor (APF2).

The indirect drive turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7≤SPF≤4).

The indirect drive turbine engine of any proceeding clause, wherein the SPF is greater than or equal to 0.95 and less than or equal to 2.5 (0.95≤SPF≤2.5).

The indirect drive turbine engine of any proceeding clause, wherein the set of composite airfoils extend spanwise between a root and a tip to define a span length and the APF is determined between 20% and 80% of the first span length and the second span length.

The indirect drive turbine engine of any proceeding clause, wherein the leading edge protector overlaps with the composite leading edge to define a sheath.

The indirect drive turbine engine of any proceeding clause, wherein the composite portion is formed from a polymer matrix composite (PMC).

The indirect drive turbine engine of any proceeding clause, wherein the leading edge protector is a metallic leading edge protector.

A turbine engine, comprising a fan, a fan casing wherein at least a primary impact zone portion comprises multiple layers including a puncture resistance layer, a turbomachine defining an engine centerline and comprising a compressor section, a combustion section, and a turbine section in serial flow order, the fan comprising a first stage of composite airfoils circumferentially arranged about the engine centerline, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL)) ((SLL/SCL)) to define a stage protection factor (SPF), and wherein the SPF is greater than or equal to 0.7 and less than or equal to 4 (0.7≤SPF≤4) wherein the first airfoil extends spanwise between a first root and a first tip to define a first span length and the second airfoil extends spanwise between a second root and a second tip to define a second span length less than the first span length.

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the first stage of composite airfoils are fan blades.

The turbine engine of any proceeding clause, wherein the second stage of composite airfoils are outlet guide vanes.

The turbine engine of any proceeding clause, wherein the SPF is determined between 20% and 80% of the first span length and the second span length, inclusive of endpoints.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 ($0.95 \leq SPF \leq 2.5$).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause, further comprising a speed reduction device driven by the turbine section for rotating the fan about the engine centerline.

The turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The turbine engine of any proceeding clause, wherein the fan drive turbine has between 3 and 5 stages.

The turbine engine of any proceeding clause, wherein the speed reduction device is a power gearbox having a power gearbox reduction ratio between 2:1 and 5:1.

The turbine engine of any proceeding clause, wherein a bypass ratio is between 10:1 and 22:1.

The turbine engine of any proceeding clause, wherein a fan blade tip speed of the fan is less than 1400 feet per second.

The turbine engine of any proceeding clause, wherein the core is an open rotor engine.

The turbine engine of any proceeding clause, wherein the speed reduction device is a power gearbox having a power gearbox reduction ratio between 6:1 and 12:1.

The turbine engine of any proceeding clause, wherein a bypass ratio is between 25:1 and 125:1.

The turbine engine of any proceeding clause, wherein the multiple layers comprise at least one puncture resistant layer and at least one energy capture layer.

The turbine engine of any proceeding clause, wherein the multiple layers further comprise a composite core having an inner surface and an outer surface wherein the at least one puncture resistant layer includes a resin to bond the at least one puncture resistant layer to the inner surface of the composite core and wherein the at least one energy capture layer includes a resin to bond the at least one energy capture layer to the outer surface of the composite core.

The turbine engine of any proceeding clause, wherein the at least one puncture resistant layer comprises a fiber and resin material with high through-thickness shear strength and high interlaminar toughness at impact.

The turbine engine of any proceeding clause, wherein the at least one puncture resistant layer comprises at least one of a nonwoven fabric, a wrap, a blanket, a winding, a woven fabric, a knitted fabric, a carded non-woven fabric, or a braided fabric.

The turbine engine of any proceeding clause, wherein the at least one puncture resistant layer comprises fibers comprised of at least one of S2 glass, E-glass, quartz, alumina, silica, boron oxide, or carbon and a resin with high fracture toughness.

The turbine engine of any proceeding clause, wherein the at least one puncture resistant layer comprises S2 glass fibers and a dicyclopentadiene (DCPD) resin.

The turbine engine of any proceeding clause, wherein the at least one energy capture layer comprises a fiber and resin material with high in-plane tensile strength and low resistance to delamination and fiber-matrix debonding.

The turbine engine of any proceeding clause, wherein the at least one energy capture layer comprises at least one of a nonwoven fabric, a wrap, a blanket, a winding, a woven fabric, a knitted fabric, a carded non-woven fabric, or a braided fabric.

The turbine engine of any proceeding clause, wherein the at least one energy capture layer comprises fibers comprised of at least one of graphite, carbon, polyimide, aromatic polyamide, or ultra-high molecular weight polyethylene and a resin that does not bond well with the fibers to facilitate delamination and fiber-matrix debonding.

The turbine engine of any proceeding clause, wherein the at least one energy capture layer further comprises at least one of a fiber sizing or surface treatment for minimizing fiber-to-resin adhesion.

The turbine engine of any proceeding clause, wherein the at least one energy capture layer comprises carbon fibers and a dicyclopentadiene (DCPD) resin.

The turbine engine of any proceeding clause, wherein the at least one puncture resistant layer comprises S2 glass fibers and a dicyclopentadiene (DCPD) resin and the at least one energy capture layer comprises carbon fibers and a dicyclopentadiene (DCPD) resin.

The turbine engine of any proceeding clause, wherein the composite core comprises a reinforcing fabric.

The turbine engine of any proceeding clause, wherein the composite core further includes reinforcement stitching to control delamination upon impact.

The turbine engine of any proceeding clause, wherein a woven glass layer is included in the multiple layers.

The turbine engine of any proceeding clause, wherein the multiple layers further comprise an inner composite fiber layer and an outer composite fiber layer, wherein the woven glass layer is sandwiched between the inner composite fiber layer and the outer composite fiber layer and wherein the inner composite fiber layer, outer composite fiber layer, and the outer composite fiber layer abuts the inner composite fiber layer beyond the primary impact zone.

The turbine engine of any proceeding clause, wherein at least one of the inner and outer composite fiber layers is co-extensive with the fan casing.

The turbine engine of any proceeding clause, wherein both the inner and outer composite fiber layers are co-extensive with the fan casing.

The turbine engine of any proceeding clause, wherein the outer composite fiber layer extends an axial length less than the inner composite fiber layer, and the inner composite fiber layer is co-extensive with the fan casing.

The turbine engine of any proceeding clause, wherein the woven glass layer is coextensive with the primary impact zone.

The turbine engine of any proceeding clause, wherein the woven glass layer defines a thickness in the radial direction that varies in the axial direction.

The turbine engine of any proceeding clause, wherein the woven glass layer tapers from a point where a blade trajectory path intersects the fan casing until terminating in a point where the outer composite fiber layer abuts the inner composite fiber layer.

The turbine engine of any proceeding clause, wherein at least one of the inner or outer composite fiber layers has a constant thickness.

The turbine engine of any proceeding clause, wherein the inner composite fiber layer has a constant thickness.

The turbine engine of any proceeding clause, further comprising another layer overlying the outer composite fiber layer.

The turbine engine of any proceeding clause, wherein at least one of the inner or outer composite fiber layers is a carbon fiber.

The turbine engine of any proceeding clause, wherein the carbon fiber is graphite.

The turbine engine of any proceeding clause, wherein the inner composite fiber layer is a textile composite material.

The turbine engine of any proceeding clause, wherein the glass layer is a woven glass layer.

The turbine engine of any proceeding clause, wherein the inner composite layer is formed from a woven fiber with a weave oriented such that the weave direction is in a first direction with respect to the structure and the weft weave direction is in a second direction perpendicular to the first direction.

The turbine engine of any proceeding clause, wherein the multiple layer structure extends axially to define a structure axial length and both the inner and outer composite fiber layers extend an axial length equal to the structure axial length.

The turbine engine of any proceeding clause, wherein the outer composite fiber layer extends an axial length less than the inner composite fiber layer.

The turbine engine of any proceeding clause, wherein the woven glass layer is coextensive with the impact zone.

The turbine engine of any proceeding clause, wherein the woven glass layer defines a thickness in a radial direction that varies in an axial direction.

The turbine engine of any proceeding clause, wherein the woven glass layer tapers from a point where a projectile trajectory path intersects the multiple layer structure until terminating in a point where the outer composite fiber layer abuts the inner composite fiber layer.

The turbine engine of any proceeding clause, wherein at least one of the inner or outer composite fiber layers has a constant thickness.

The turbine engine of any proceeding clause, further comprising another layer overlying the outer composite fiber layer.

The turbine engine of any proceeding clause, wherein at least one of the inner or outer composite fiber layers is a carbon fiber.

The turbine engine of any proceeding clause, wherein the inner composite fiber layer is a textile composite material.

A method for making a fan casing for any of the proceeding turbine engines. The method comprising disposing one or more layers of a puncture resistant material on a layup mandrel, disposing one more layers of a structural composite material on an exterior surface of the puncture resistant material, disposing one or more layers of an energy capture material on an exterior surface of the structural material, and curing a resin in the composite core, the one or more layers of the puncture resistant material and the one or more layers of the energy capture material.

The method of any proceeding clause, further comprising infusing the composite core, the one or more layers of the puncture resistant material and the one or more layers of the energy capture material with resin.

The method of any proceeding clause, wherein the one or more layers of the puncture resistant material comprises fibers comprised of S2 glass, E-glass, quartz, alumina, silica, boron oxide, or carbon fibers and a resin with high fracture toughness.

The method of any proceeding clause, wherein the one or more layers of the energy capture material comprises fibers comprised of at least one of graphite, carbon, polyimide, aromatic polyamide, or ultra-high molecular weight polyethylene and a resin that does not bond well with the fibers to facilitate delamination and fiber-matrix debonding.

The method of any proceeding clause, further including a step of at least partially curing a resin in the composite core and the one or more layers of the puncture resistant material, prior to disposing one or more layers of an energy capture material on an exterior surface of the structural material.

A method for making a fan casing for any of the proceeding turbine engines. The method comprising fabricating an annular shell having a constant thickness, wrapping the annular shell with an annular casing wrap having at least one carbon layer and at least one woven glass layer, confining the at least one woven glass layer to the primary impact zone, and producing a point of maximum thickness of annular casing wrap within the primary impact zone.

The method of any proceeding clause, wherein the wrapping the annular shell further includes abutting the at least one carbon layer with the annular shell outside the primary impact zone.

The method of any proceeding clause, further including tapering at least one of the carbon layer or glass layer from the point of maximum thickness to where the at least one carbon layer abuts the annular shell.

A turbine engine comprising a fan, a fan casing wherein at least a primary impact zone portion comprises multiple layers including at least one puncture resistance layer, a turbomachine defining an engine centerline and comprising a compressor section, a combustion section, and a turbine section in serial flow order and a set of composite airfoils comprising a set of fan blades and a set of outlet guide vanes downstream from the set of fan blades, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL)) ((CL)) to define an airfoil protection factor (APF) and a first APF (APF1) for the set of fan blades is greater than or equal to 0.2 and less than or equal to 0.30 (0.2≤APF1≤0.3) and a second APF (APF2) for the set of outlet guide vanes is greater than or equal to 0.08 and less than or equal to 0.17 (0.08≤APF2≤0.17).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.95 and less than or equal to 2.5 (0.95≤SPF≤2.5).

The turbine engine of any proceeding clause, wherein the set of composite airfoils extend spanwise between a root and a tip to define a span length and the APF is determined at a location between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

The turbine engine of any proceeding clause, further comprising a speed reduction device driven by the turbine section for rotating the fan about the engine centerline.

The turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The turbine engine of any proceeding clause, wherein the fan drive turbine has between 3 and 5 stages.

The turbine engine of any proceeding clause, wherein the speed reduction device is a power gearbox having a power gearbox reduction ratio between 2:1 and 5:1.

The turbine engine of any proceeding clause, wherein a bypass ratio is between 10:1 and 22:1.

The turbine engine of any proceeding clause, wherein a fan blade tip speed of the fan is less than 1400 feet per second.

The turbine engine of any proceeding clause, wherein the core is an open rotor engine.

The turbine engine of any proceeding clause, wherein the speed reduction device is a power gearbox having a power gearbox reduction ratio between 6:1 and 12:1.

The turbine engine of any proceeding clause, wherein a bypass ratio is between 25:1 and 125:1.

The turbine engine of any proceeding clause, wherein the multiple layers further comprise at least one energy capture layer.

The turbine engine of any proceeding clause, wherein the multiple layers further comprise a composite core having an inner surface and an outer surface wherein the at least one puncture resistant layer includes a resin to bond the at least one puncture resistant layer to the inner surface of the composite core and wherein the at least one energy capture layer includes a resin to bond the at least one energy capture layer to the outer surface of the composite core.

The turbine engine of any proceeding clause, wherein the at least one puncture resistant layer comprises a fiber and resin material with high through-thickness shear strength and high interlaminar toughness at impact.

The turbine engine of any proceeding clause, wherein the at least one puncture resistant layer comprises at least one of a nonwoven fabric, a wrap, a blanket, a winding, a woven fabric, a knitted fabric, a carded non-woven fabric, or a braided fabric.

The turbine engine of any proceeding clause, wherein the at least one puncture resistant layer comprises fibers comprised of at least one of S2 glass, E-glass, quartz, alumina, silica, boron oxide, or carbon and a resin with high fracture toughness.

The turbine engine of any proceeding clause, wherein the at least one puncture resistant layer comprises S2 glass fibers and a dicyclopentadiene (DCPD) resin.

The turbine engine of any proceeding clause, wherein the at least one energy capture layer comprises a fiber and resin material with high in-plane tensile strength and low resistance to delamination and fiber-matrix debonding.

The turbine engine of any proceeding clause, wherein the at least one energy capture layer comprises at least one of a nonwoven fabric, a wrap, a blanket, a winding, a woven fabric, a knitted fabric, a carded non-woven fabric, or a braided fabric.

The turbine engine of any proceeding clause, wherein the at least one energy capture layer comprises fibers comprised of at least one of graphite, carbon, polyimide, aromatic polyamide, or ultra-high molecular weight polyethylene and a resin that does not bond well with the fibers to facilitate delamination and fiber-matrix debonding.

The turbine engine of any proceeding clause, wherein the at least one energy capture layer further comprises at least one of a fiber sizing or surface treatment for minimizing fiber-to-resin adhesion.

The turbine engine of any proceeding clause, wherein the at least one energy capture layer comprises carbon fibers and a dicyclopentadiene (DCPD) resin.

The turbine engine of any proceeding clause, wherein the at least one puncture resistant layer comprises S2 glass fibers and a dicyclopentadiene (DCPD) resin and the at least one energy capture layer comprises carbon fibers and a dicyclopentadiene (DCPD) resin.

The turbine engine of any proceeding clause, wherein the composite core comprises a reinforcing fabric.

The turbine engine of any proceeding clause, wherein the composite core further includes reinforcement stitching to control delamination upon impact.

The turbine engine of any proceeding clause, wherein the at least one puncture resistant layer is a woven glass layer.

The turbine engine of any proceeding clause, wherein the multiple layers further comprise an inner composite fiber layer and an outer composite fiber layer, wherein the woven glass layer is sandwiched between the inner composite fiber layer and the outer composite fiber layer and wherein the inner composite fiber layer, outer composite fiber layer, and the outer composite fiber layer abuts the inner composite fiber layer beyond the primary impact zone.

The turbine engine of any proceeding clause, wherein at least one of the inner and outer composite fiber layers is co-extensive with the fan casing.

The turbine engine of any proceeding clause, wherein both the inner and outer composite fiber layers are co-extensive with the fan casing.

The turbine engine of any proceeding clause, wherein the outer composite fiber layer extends an axial length less than the inner composite fiber layer, and the inner composite fiber layer is co-extensive with the fan casing.

The turbine engine of any proceeding clause, wherein the woven glass layer is coextensive with the primary impact zone.

The turbine engine of any proceeding clause, wherein the woven glass layer defines a thickness in the radial direction that varies in the axial direction.

The turbine engine of any proceeding clause, wherein the woven glass layer tapers from a point where a blade trajectory path intersects the fan casing until terminating in a point where the outer composite fiber layer abuts the inner composite fiber layer.

The turbine engine of any proceeding clause, wherein at least one of the inner or outer composite fiber layers has a constant thickness.

The turbine engine of any proceeding clause, wherein the inner composite fiber layer has a constant thickness.

The turbine engine of any proceeding clause, further comprising another layer overlying the outer composite fiber layer.

The turbine engine of any proceeding clause, wherein at least one of the inner or outer composite fiber layers is a carbon fiber.

The turbine engine of any proceeding clause, wherein the carbon fiber is graphite.

The turbine engine of any proceeding clause, wherein the inner composite fiber layer is a textile composite material.

The turbine engine of any proceeding clause, wherein the glass layer is a woven glass layer.

The turbine engine of any proceeding clause, wherein the inner composite layer is formed from a woven fiber with a weave oriented such that the weave direction is in a first direction with respect to the structure and the weft weave direction is in a second direction perpendicular to the first direction.

The turbine engine of any proceeding clause, wherein the multiple layer structure extends axially to define a structure axial length and both the inner and outer composite fiber layers extend an axial length equal to the structure axial length.

The turbine engine of any proceeding clause, wherein the outer composite fiber layer extends an axial length less than the inner composite fiber layer.

The turbine engine of any proceeding clause, wherein the woven glass layer is coextensive with the impact zone.

The turbine engine of any proceeding clause, wherein the woven glass layer defines a thickness in a radial direction that varies in an axial direction.

The turbine engine of any proceeding clause, wherein the woven glass layer tapers from a point where a projectile trajectory path intersects the multiple layer structure until terminating in a point where the outer composite fiber layer abuts the inner composite fiber layer.

The turbine engine of any proceeding clause, wherein at least one of the inner or outer composite fiber layers has a constant thickness.

The turbine engine of any proceeding clause, further comprising another layer overlying the outer composite fiber layer.

The turbine engine of any proceeding clause, wherein at least one of the inner or outer composite fiber layers is a carbon fiber.

The turbine engine of any proceeding clause, wherein the inner composite fiber layer is a textile composite material.

A method for making a fan casing for any of the proceeding turbine engines. The method comprising disposing one or more layers of a puncture resistant material on a layup mandrel, disposing one more layers of a structural composite material on an exterior surface of the puncture resistant material, disposing one or more layers of an energy capture material on an exterior surface of the structural material, and curing a resin in the composite core, the one or more layers of the puncture resistant material and the one or more layers of the energy capture material.

The method of any proceeding clause, further comprising infusing the composite core, the one or more layers of the puncture resistant material and the one or more layers of the energy capture material with resin.

The method of any proceeding clause, wherein the one or more layers of the puncture resistant material comprises fibers comprised of S2 glass, E-glass, quartz, alumina, silica, boron oxide, or carbon fibers and a resin with high fracture toughness.

The method of any proceeding clause, wherein the one or more layers of the energy capture material comprises fibers comprised of at least one of graphite, carbon, polyimide, aromatic polyamide, or ultra-high molecular weight polyethylene and a resin that does not bond well with the fibers to facilitate delamination and fiber-matrix debonding.

The method of any proceeding clause, further including a step of at least partially curing a resin in the composite core and the one or more layers of the puncture resistant material, prior to disposing one or more layers of an energy capture material on an exterior surface of the structural material.

A method for making a fan casing for any of the proceeding turbine engines. The method comprising fabricating an annular shell having a constant thickness, wrapping the annular shell with an annular casing wrap having at least one carbon layer and at least one woven glass layer, confining the at least one woven glass layer to the primary impact zone, and producing a point of maximum thickness of annular casing wrap within the primary impact zone.

The method of any proceeding clause, wherein the wrapping the annular shell further includes abutting the at least one carbon layer with the annular shell outside the primary impact zone.

The method of any proceeding clause, further including tapering at least one of the carbon layer or glass layer from the point of maximum thickness to where the at least one carbon layer abuts the annular shell.

What is claimed is:

1. A turbine engine, comprising:
   a fan;
   a fan casing wherein at least a primary impact zone comprises multiple layers including at least one puncture resistance layer;
   a turbomachine defining an engine centerline and comprising a compressor section, a combustion section, and a turbine section in serial flow order;
   the fan comprising a first stage of composite airfoils circumferentially arranged about the engine centerline at the primary impact zone, a first airfoil of the first stage of composite airfoils comprising:
   a first composite portion extending chordwise between a first composite leading edge and a first trailing edge;
   a first leading edge protector receiving at least a portion of the first composite leading edge of the first composite portion, the first leading edge protector extending chordwise from a first leading edge towards the first composite portion for a first leading length (FLL); and the first composite portion and the first leading edge protector together defining an exterior surface of the first airfoil and extending chordwise between the first leading edge and the first trailing edge to define a first chord length (FCL);

a second stage of composite airfoils located downstream of the first stage of composite airfoils and circumferentially arranged about the engine centerline, a second airfoil of the second stage of composite airfoils comprising:

a second composite portion extending chordwise between a second composite leading edge and a second trailing edge;

a second leading edge protector receiving at least a portion of the second composite leading edge of the second composite portion, the second leading edge protector extending chordwise from a second leading edge towards the second composite portion for a second leading length (SLL); and the second composite portion and the second leading edge protector together defining an exterior surface of the second airfoil and extending chordwise between the second leading edge and the second trailing edge to define a second chord length (SCL);

wherein the first leading length (FLL) and the first chord length (FCL) are related to the second leading length (SLL) and the second chord length (SCL) by a stage protection factor (SPF), wherein the $$SPF = \frac{\left(\frac{FLL}{FCL}\right)}{\left(\frac{SLL}{SCL}\right)}$$

and the SPF is greater than or equal to 0.7 and less than or equal to 4 (0.7≤SPF≤4); wherein the first airfoil extends spanwise between a first root and a first tip to define a first span length and the second airfoil extends spanwise between a second root and a second tip to define a second span length less than the first span length.

2. The turbine engine of claim 1 wherein the first stage of composite airfoils and the second stage of composite airfoils include a polymer matrix composite and at least one of the first leading edge protector or the second leading edge protector is a metallic leading edge protector.

3. The turbine engine of claim 1 wherein the composite airfoils of the second stage of composite airfoils are outlet guide vanes.

4. The turbine engine of claim 1, further comprising a speed reduction device driven by the turbine section for rotating the fan about the engine centerline.

5. The turbine engine of claim 1, wherein the multiple layers further comprise at least one energy capture layer.

6. The turbine engine of claim 5, wherein the multiple layers further comprises a composite core having an inner surface and an outer surface wherein the at least one puncture resistant layer includes a resin to bond the at least one puncture resistant layer to the inner surface of the composite core and wherein the at least one energy capture layer includes a resin to bond the at least one energy capture layer to the outer surface of the composite core.

7. The turbine engine of claim 5, wherein the puncture resistant layer comprises fibers comprised of at least one of S2 glass, E-glass, quartz, alumina, silica, boron oxide, or carbon and the at least one energy capture layer comprises fibers comprised of at least one of graphite, carbon, polyimide, aromatic polyamide, or ultra-high molecular weight polyethylene.

8. The turbine engine of claim 1, wherein the at least one puncture resistant layer is a woven glass layer.

9. The turbine engine of claim 8, wherein the multiple layers further comprise an inner composite fiber layer and an outer composite fiber layer, wherein the woven glass layer is sandwiched between the inner composite fiber layer and the outer composite fiber layer and wherein the outer composite fiber layer abuts the inner composite fiber layer beyond the primary impact zone.

10. The turbine engine of claim 9, wherein the woven glass layer defines a thickness in the radial direction that varies in the axial direction.

11. The turbine engine of claim 10, wherein at least one of the inner composite fiber layer or the outer composite fiber layer has a constant thickness.

12. A turbine engine comprising:

a fan;

a fan casing wherein at least a primary impact zone portion comprises multiple layers including at least one puncture resistance layer;

a turbomachine defining an engine centerline and comprising a compressor section, a combustion section, and a turbine section in serial flow order; and a set of composite airfoils comprising a set of fan blades and a set of outlet guide vanes downstream from the set of fan blades, an airfoil of the set of composite airfoils comprising:

a composite portion extending chordwise between a composite leading edge and a trailing edge;

a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); and wherein the leading length (LL) is related to the chord length (CL) by an airfoil protection factor $$(APF) = \frac{(LL)}{(CL)}$$

and a first airfoil protection factor (APF1) for the set of fan blades is greater than or equal to 0.2 and less than or equal to 0.30 (0.2≤APF1≤0.3) and a second airfoil protection factor (APF2) for the set of outlet guide vanes is greater than or equal to 0.08 and less than or equal to 0.17 (0.08≤APF2≤0.17).

13. The turbine engine of claim 12, wherein the APF1 relates to the APF2 by an expression:

$$\frac{APF1}{APF2}$$

to define a stage protection factor (SPF), wherein the SPF is greater than or equal to 0.95 and less than or equal to 2.5 ($0.95 \leq SPF \leq 2.5$).

14. The turbine engine of claim 12, further comprising a speed reduction device driven by the turbine section for rotating the fan about the engine centerline.

15. The turbine engine of claim 12, wherein the multiple layers further comprise at least one energy capture layer.

16. The turbine engine of claim 15, wherein the multiple layers further comprises a composite core having an inner surface and an outer surface wherein the at least one puncture resistant layer includes a resin to bond the at least one puncture resistant layer to the inner surface of the composite core and wherein the at least one energy capture layer includes a resin to bond the at least one energy capture layer to the outer surface of the composite core.

17. The turbine engine of claim 12, wherein the at least one puncture resistant layer is a woven glass layer.

18. The turbine engine of claim 17, wherein the multiple layers further comprise an inner composite fiber layer and an outer composite fiber layer, wherein the woven glass layer is sandwiched between the inner composite fiber layer and the outer composite fiber layer and wherein the woven glass layer is at the primary impact zone and the outer composite fiber layer abuts the inner composite fiber layer beyond primary impact zone.

19. The turbine engine of claim 18, wherein the woven glass layer defines a thickness in the radial direction that varies in the axial direction.

20. The turbine engine of claim 19, wherein at least one of the inner composite fiber layer or the outer composite fiber layer has a constant thickness.

* * * * *